United States Patent
Kato

(10) Patent No.: US 11,323,684 B2
(45) Date of Patent: May 3, 2022

(54) APPARATUS, SYSTEM, AND METHOD OF PROCESSING IMAGE DATA TO BE RELAYED

(71) Applicant: Ricoh Company, Ltd., Tokyo (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 82 days.

(21) Appl. No.: 16/699,260

(22) Filed: Nov. 29, 2019

(65) Prior Publication Data

US 2020/0177864 A1    Jun. 4, 2020

(30) Foreign Application Priority Data

Nov. 30, 2018 (JP) .............................. JP2018-225918
Nov. 20, 2019 (JP) .............................. JP2019-209599

(51) Int. Cl.
*H04N 13/194* (2018.01)
*H04N 13/111* (2018.01)
*H04N 13/189* (2018.01)

(52) U.S. Cl.
CPC ......... *H04N 13/194* (2018.05); *H04N 13/111* (2018.05); *H04N 13/189* (2018.05)

(58) Field of Classification Search
CPC .. H04N 13/194; H04N 13/189; H04N 13/111; H04N 5/232; H04N 5/772; H04N 5/38; H04N 5/44; H04N 7/14; H04N 7/15; H04N 7/147; G06T 1/00; G06F 3/0488
USPC .. 348/43, 14.02, 14.03, 14.04, 14.07, 14.12; 705/26.5
See application file for complete search history.

(56) References Cited

U.S. PATENT DOCUMENTS

| | | | | |
|---|---|---|---|---|
| 9,870,754 | B2* | 1/2018 | Ishigami | G06F 3/1423 |
| 10,217,488 | B1* | 2/2019 | Huang | H04N 5/232 |
| 10,735,597 | B1* | 8/2020 | Zagorski | H04L 65/608 |
| 2004/0160635 | A1* | 8/2004 | Ikeda | H04N 5/772 |
| | | | | 358/1.15 |
| 2008/0254840 | A1* | 10/2008 | Kano | H04N 7/147 |
| | | | | 455/566 |

(Continued)

FOREIGN PATENT DOCUMENTS

| | | |
|---|---|---|
| JP | 2003-050767 | 2/2003 |
| JP | 2013-074394 | 4/2013 |

(Continued)

OTHER PUBLICATIONS

U.S. Appl. No. 16/526,617, filed Jul. 30, 2019, Yoshinaga Kato.

*Primary Examiner* — John W Miller
*Assistant Examiner* — Sean N. Haiem
(74) *Attorney, Agent, or Firm* — Xsensus LLP

(57) ABSTRACT

A relay apparatus for transferring image data transmitted from a transmission source to a transmission destination, including circuitry to: receive video image data from a first apparatus being the transmission source; determine whether a second apparatus being a transmission destination is capable of reproducing the video image data received from the first apparatus; based on a determination that the second apparatus is not capable of reproducing the video image data received from the first apparatus, apply image processing to the video image data to generate image data compatible with the second apparatus; and transfer the image data compatible with the second apparatus, to the second apparatus.

13 Claims, 19 Drawing Sheets

(56) References Cited

U.S. PATENT DOCUMENTS

| | | | |
|---|---|---|---|
| 2009/0031069 A1* | 1/2009 | Habuto | G11B 27/10 |
| | | | 710/303 |
| 2013/0127980 A1* | 5/2013 | Haddick | G02B 27/0093 |
| | | | 348/14.08 |
| 2013/0271557 A1* | 10/2013 | Kato | H04N 5/44513 |
| | | | 348/14.07 |
| 2014/0240441 A1* | 8/2014 | Hinohara | H04N 1/00299 |
| | | | 348/14.04 |
| 2015/0130887 A1* | 5/2015 | Thelin | H04N 7/147 |
| | | | 348/14.03 |
| 2016/0088258 A1* | 3/2016 | Nagase | H04N 7/15 |
| | | | 348/14.12 |
| 2016/0092947 A1* | 3/2016 | Nagase | H04N 7/15 |
| | | | 705/26.5 |
| 2017/0031646 A1* | 2/2017 | Imai | G09G 5/003 |
| 2017/0034482 A1* | 2/2017 | Nagamine | H04N 7/15 |
| 2017/0237986 A1* | 8/2017 | Choi | H04W 4/80 |
| | | | 348/14.02 |
| 2017/0339370 A1* | 11/2017 | Inoue | G06F 3/0488 |
| 2019/0080197 A1* | 3/2019 | Kato | G06T 5/006 |
| 2019/0281111 A1 | 9/2019 | Yamamoto | |
| 2019/0306175 A1 | 10/2019 | Kato et al. | |
| 2019/0306334 A1 | 10/2019 | Katoh et al. | |

FOREIGN PATENT DOCUMENTS

| | | |
|---|---|---|
| JP | 2016-519812 | 7/2016 |
| WO | WO2014/145877 A2 | 9/2014 |
| WO | WO2016/031549 A1 | 3/2016 |

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

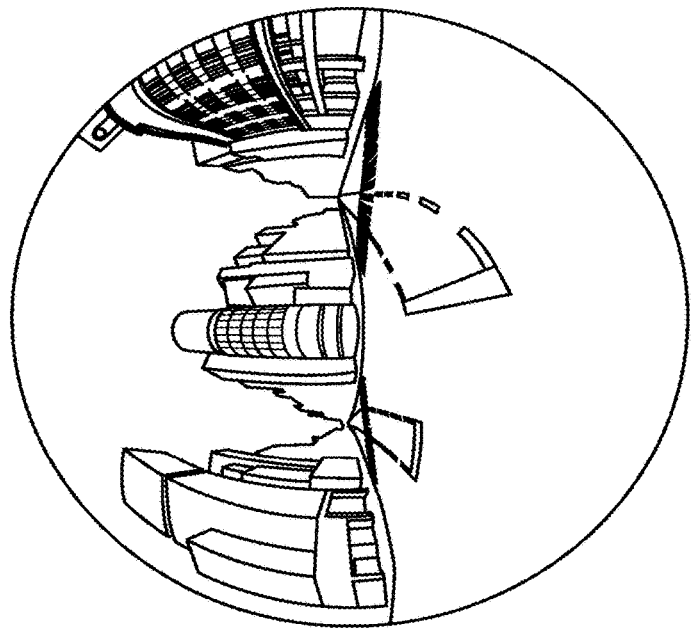
FIG. 5B
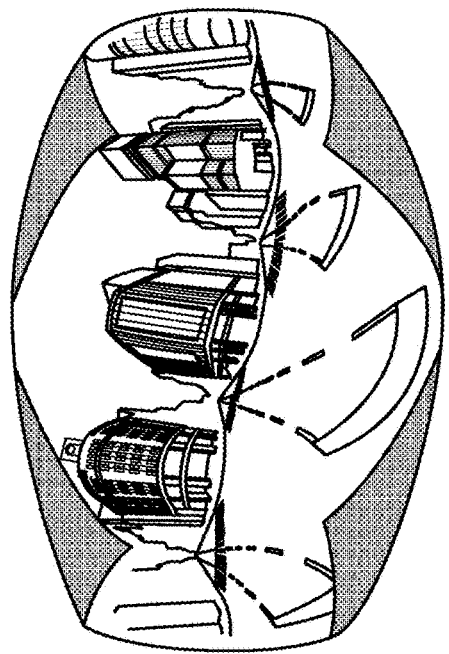
FIG. 5A
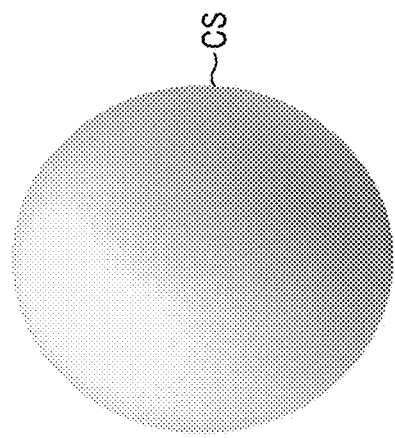

FIG. 14A

| DEVICE ID OF SENDER | DEVICE ID OF RECEIVER |
|---|---|
| 01aa | 02aa, 02ab, |
| 01ab | 02ac, 02ad |
| ... | ... |

FIG. 14B

| DEVICE ID OF SENDER | TYPE OF TRANSMITTABLE IMAGE |
|---|---|
| 01aa | None (→S, →S, V2) |
| 01ab | None (→V3) |
| 01ac | None (→S) |
| ... | ... |

FIG. 14C

| DEVICE ID OF RECEIVER | TYPE OF REPRODUCIBLE IMAGE |
|---|---|
| 02aa | S |
| 02ab | V2 |
| 02ac | S, V3 |
| ... | ... |

FIG. 14D

| DEVICE ID OF SENDER | DEVICE ID OF RECEIVER FOR SPHERICAL VIDEO IMAGE (V3) | DEVICE ID OF RECEIVER FOR PLANAR VIDEO IMAGE (V2) | DEVICE ID OF RECEIVER FOR PLANAR STILL IMAGE (S) |
|---|---|---|---|
| 01aa | | | 02aa |
| 01ab | 02ac | 02ab | |
| ... | ... | ... | ... |

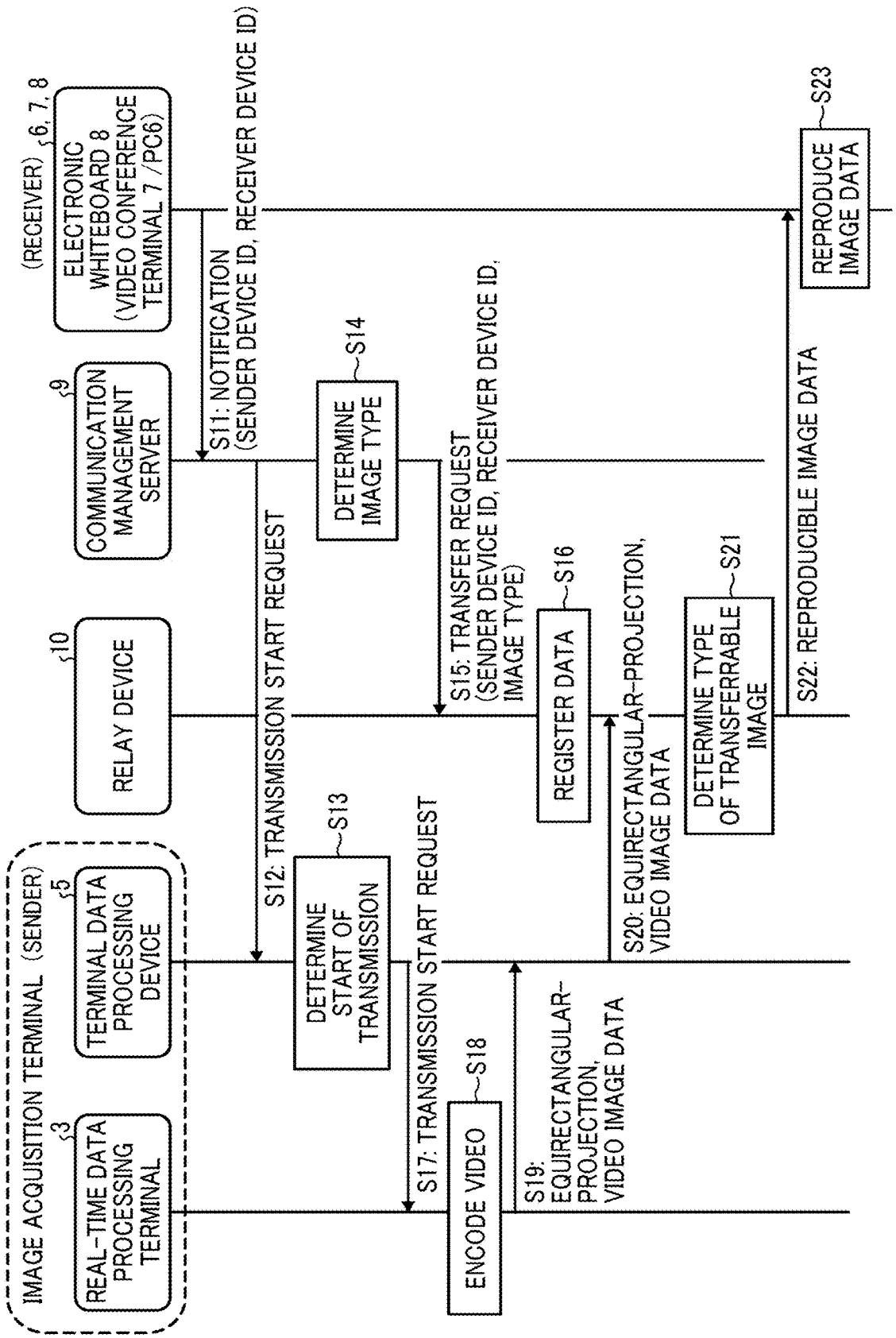

APPARATUS, SYSTEM, AND METHOD OF PROCESSING IMAGE DATA TO BE RELAYED

CROSS-REFERENCE TO RELATED APPLICATIONS

This patent application is based on and claims priority pursuant to 35 U.S.C. § 119(a) to Japanese Patent Application Nos. 2018-225918, filed on Nov. 30, 2018, and 2019-209599, filed on Nov. 20, 2019, in the Japan Patent Office, the entire disclosure of which is hereby incorporated by reference herein.

BACKGROUND

Technical Field

The present invention relates to an apparatus, system, and method of processing image data to be relayed.

Description of the Related Art

Recently, streaming is used to continuously transmit data, such as audio and video, from one side to other side. Through streaming, image data captured at a communication terminal on a sender side is transmitted to a communication terminal on a receiver side, and processed in real time for display on the receiver side.

SUMMARY

Example embodiments include a relay apparatus for transferring image data transmitted from a transmission source to a transmission destination, the relay apparatus comprising circuitry to: receive video image data from a first apparatus being the transmission source; determine whether a second apparatus being a transmission destination is capable of reproducing the video image data received from the first apparatus; based on a determination that the second apparatus is not capable of reproducing the video image data received from the first apparatus, apply image processing to the video image data to generate image data compatible with the second apparatus; and transfer the image data compatible with the second apparatus, to the second apparatus.

Example embodiments include a system for processing image data to be relayed between a transmission source and a transmission destination, the system comprising circuitry configured to: receive video image data from a first apparatus being the transmission source; determine whether a second apparatus being a transmission destination is capable of reproducing the video image data received from the first apparatus; based on a determination that the second apparatus is not capable of reproducing the video image data received from the first apparatus, apply image processing to the video image data to generate image data compatible with the second apparatus; and transfer the image data compatible with the second apparatus, to the second apparatus.

Example embodiments include a method of processing image data to be relayed between a transmission source and a transmission destination, the method comprising: receiving video image data from a first apparatus being the transmission source; determining whether a second apparatus being a transmission destination is capable of reproducing the video image data received from the first apparatus; based on a determination that the second apparatus is not capable of reproducing the video image data received from the first apparatus, applying image processing to the video image data to generate image data compatible with the second apparatus; and transferring the image data compatible with the second apparatus, to the second apparatus.

BRIEF DESCRIPTION I/F THE SEVERAL VIEWS I/F THE DRAWINGS

A more complete appreciation of the disclosure and many of the attendant advantages and features thereof can be readily obtained and understood from the following detailed description with reference to the accompanying drawings, wherein:

FIG. 5A and FIG. 5B are views respectively illustrating the image in equirectangular projection covering a surface of a sphere, and a spherical image, according to an embodiment;

FIG. 14A is a conceptual diagram illustrating an example communication management table;

FIG. 14B is a conceptual diagram illustrating an example of transmittable image type management table;

FIG. 14C is a conceptual diagram illustrating an example of reproducible image type management table;

FIG. 14D is a conceptual diagram illustrating an example transfer image type management table;

FIG. 15 is a data sequence diagram illustrating example operation of transmitting and receiving image data while determining a type of image data to be transmitted, according to an embodiment;

Figure 1:
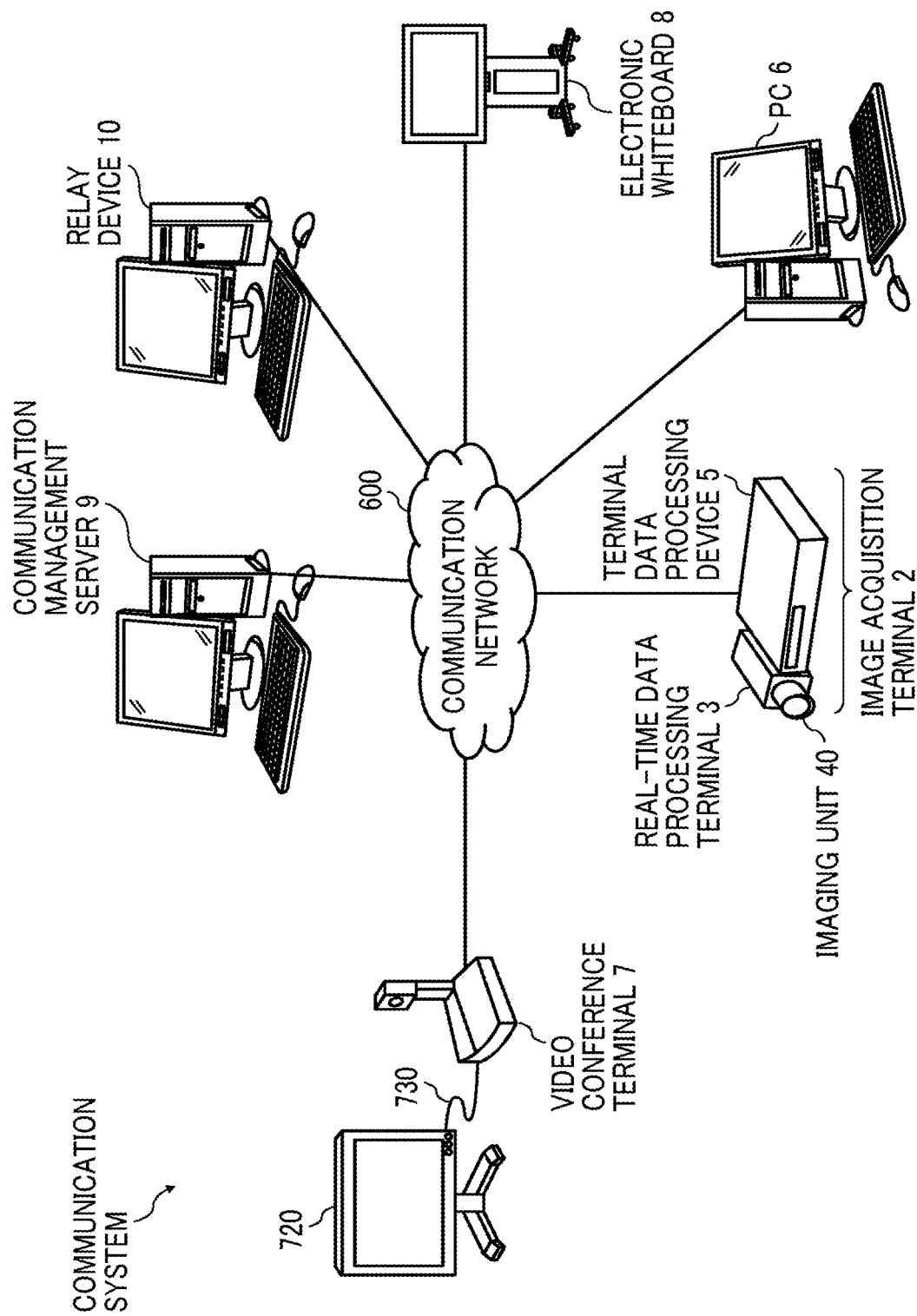
FIG. 1 is a schematic diagram illustrating a configuration of a communication system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Configuration of Communication System

Referring to the drawings, one or more embodiments of the present invention are described. FIG. 1 is a schematic diagram illustrating a configuration of a communication system 1 according to an embodiment.

As illustrated in FIG. 1, the communication system 1 of this embodiment includes a real-time data processing terminal 3, a terminal data processing device 5, a personal computer (PC) 6, a video conference terminal 7, an electronic whiteboard 8, a communication management server 9, and a relay device 10.

The real-time data processing terminal 3 is a terminal that captures images in real-time to obtain real-time captured image data. The real-time data processing terminal 3 is detachably connected to an imaging unit 40 provided with an image sensor that captures an image of a target, such as a Complementary Metal Oxide Semiconductor (CMOS) sensor or a Charge Coupled Device (CCD) sensor. With this configuration, the real-time data processing terminal 3 digitizes an image captured by the imaging unit 40 into captured image data.

The captured image data that the real-time data processing terminal 3 obtains depends on a type of the imaging unit 4. In one embodiment, when the imaging unit 40a to be described later is used, two types of image can be obtained including a planar video image and a planar still image. In another embodiment, when the imaging unit 40b to be described later is used, four types of image can be obtained including a spherical video image, a spherical still image, a planar video image, and a planar still image. The real-time data processing terminal 3 may encode the captured image data for output to the terminal data processing device 5. In case the real-time data processing terminal 3 encodes the still image data, the still image data is encoded in a standard format applicable to a still image, such as Joint Photographic Experts Group (JPEG). In case the real-time data processing terminal 3 encodes the video image data, the video image data is encoded in a standard format applicable to a video image, such as H. 264. Other examples of standard format applicable to a video image include, but not limited to, VP8, VP9, VP10, and AV1.

The terminal data processing device 5, which is located closely to the real-time data processing terminal 3, is connected to the real-time data processing terminal 3 in a one-to-one correspondence, for example, by a data bus, a Universal Serial Bus (USB). The terminal data processing device 5 transmits the captured image data input from the real-time data processing terminal 3 to the relay device 10 via the communication network 600. The communication network 600 is implemented by the intranet, the Internet, etc., which may be wired or wireless.

The real-time data processing terminal 3 and the terminal data processing device 5 are connected with each other so as to together function as the image acquisition terminal 2.

The PC 6 reproduces the image data received from the relay device 10 to display the image on the display 608 to be described below. The PC 6 in this embodiment is capable of processing various types of image, such as a spherical video image, a spherical still image, a planar video image, and a planar still image.

In example operation, the image acquisition terminal 2 transmits the captured image data to, for example, the PC 6 in real-time. For example, the image acquisition terminal 2 may be provided at a certain location to capture an image of a human face, and send captured image data of the human face to a server or the PC 6. For example, at the server, the captured human face may be analyzed to identify a user. In another example, the PC 6 may control a display to display the captured human face, or an analysis result transmitted from the server. In either case, a data format of image data to be transmitted to the server or the PC 6 is previously set, such that the PC 6 is able to reproduce the image data transmitted from the image acquisition terminal 2.

However, if the image data captured at the image acquisition terminal 2 is to be transmitted to any device other than the server or PC 6 that is previously set, the image data generated at the image acquisition terminal 2 may not always be compatible with such device. In view of this, in the following, the relay device 10 is provided, which is capable of determining a type of image data that can be reproduced at each device, and applying image processing to generate image data that can be reproduced at each device in the communication system 1.

Specifically, in this example illustrated in FIG. 1, the video conference terminal 7 and the electronic whiteboard 8 are provided in addition to the PC 6.

The video conference terminal 7 processes video data received from the relay device 10 to display video at the display 720, and processes audio data received from the relay device 10 to output audio through the speaker 715. The display 720 is electrically connected with the video conference terminal 7 through the cable 730 such as a USB cable. The video conference terminal 7 processes video data received from the relay device 10, to display video at the display 720. When a plurality of video conference terminals 7 are used, video data and audio data are transmitted or received through the relay device 10 between the video conference terminals 7 to carry out a video conference. The video conference terminal 7 according to the present embodiment is capable of reproducing planar video image data, but not capable of reproducing still image data.

The electronic whiteboard 8 reproduces the still image data transmitted from the relay device 10 to display a still image on the display 820. The user can also draw characters and the like on the display 820 of the electronic whiteboard 8 using an electronic pen 8500 to be described later. The electronic whiteboard 8 of the present embodiment is capable of reproducing planar still image data, but not capable of reproducing video data.

The communication management server 9 centrally manages login authentication of the video conference terminal 7 and the electronic whiteboard 8, communication states of the video conference terminal 7 and the electronic whiteboard 8, and a communication state of the relay device 30.

The relay device 10 operates as a router, which receives image data from the image acquisition terminal 2 (terminal data processing device 5) via the communication network 600, and sends the received image data to the video conference terminal 7 and the electronic whiteboard 8 via the communication network 600. As described blow, the image acquisition terminal 2 is an example of a transmission source (that is, a sender). The PC 6, video conference terminal 7, and electronic whiteboard 8 are each an example of a transmission destination (that is, a receiver).

[Hardware Configuration of Communication System]

Referring now to FIGS. 2 to 12, a hardware configuration of the communication system 1 is described according to the embodiment.

<Hardware Configuration of Real-Time Data Processing Terminal>

Figure 2:
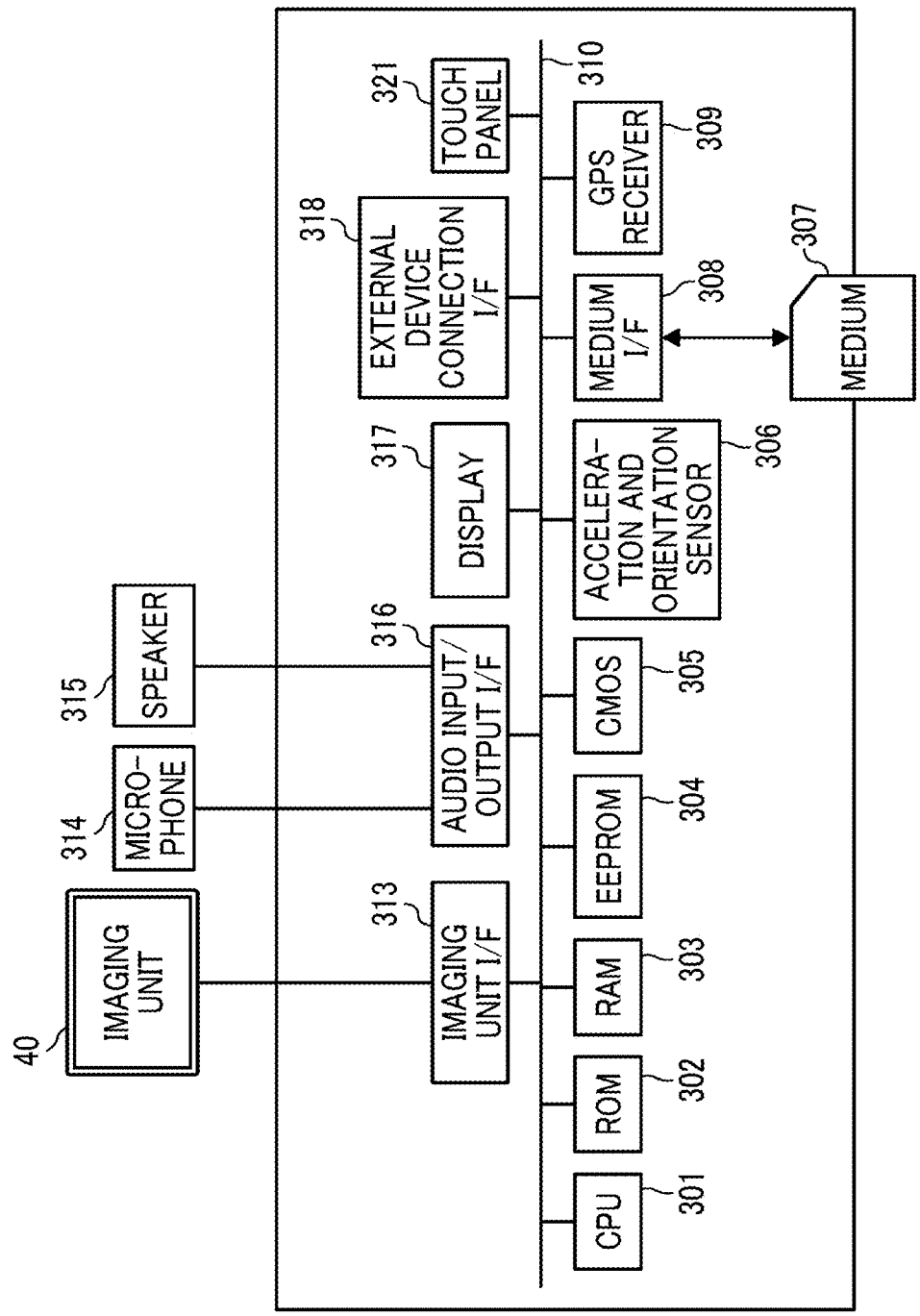
FIG. 2 is a schematic diagram illustrating a hardware configuration of a real-time data processing terminal, according to an embodiment.

FIG. 2 is a schematic diagram illustrating a hardware configuration of the real-time data processing terminal 3, according to the embodiment. The real-time data processing terminal 3 includes a CPU 301, a ROM 302, a RAM 303, an EEPROM 304, a CMOS sensor (CMOS) 305, an acceleration and orientation sensor 306, a medium I/F 308, and a GPS receiver 309.

The CPU 301 controls entire operation of the real-time data processing terminal 3. The ROM 302 stores a control program for operating the CPU 301. The RAM 303 is used as a work area for the CPU 301. The EEPROM 304 reads or writes various data such as a control program for the real-time data processing terminal 3 under control of the CPU 301. Under control of the CPU 301, the CMOS sensor 305 captures an image of a target (mainly a blind spot of the imaging unit 40) to obtain image data. The acceleration and orientation sensor 306 includes various sensors such as an electromagnetic compass or gyrocompass for detecting geomagnetism, and an acceleration sensor. The medium I/F 308 controls reading or writing of data with respect to a recording medium 307 such as a flash memory. The GPS receiver 309 receives a GPS signal from a GPS satellite.

The real-time data processing terminal 3 further includes an imaging unit I/F 313, a microphone 314, a speaker 315, an audio input/output I/F 316, a display 317, an external device connection I/F 318, and a touch panel 321.

The imaging unit I/F 313 is a circuit that controls driving of the imaging unit 40 when an external imaging unit 40 is connected to the real-time data processing terminal 3. The microphone 314 is an example of audio collecting device, which is a built-in type, capable of inputting audio under control of the CPU 401. The audio I/O I/F 316 is a circuit for inputting or outputting an audio signal to the microphone 314 or from the speaker 315 under control of the CPU 301. The display 317 may be a liquid crystal or organic electro luminescence (EL) display that displays an image of a subject, an operation icon, or the like. The external device connection I/F 318 is an interface circuit that connects the real-time data processing terminal 3 to various external devices. The touch panel 321 is an example of input device that enables the user to input a user instruction to the real-time data processing terminal 3 through touching a screen of the display 317.

The real-time data processing terminal 3 further includes a bus line 310. The bus line 310 is an address bus or a data bus, which electrically connects the elements in FIG. 2 such as the CPU 301.

<Hardware Configuration of Imaging Unit>

Figure 3A:
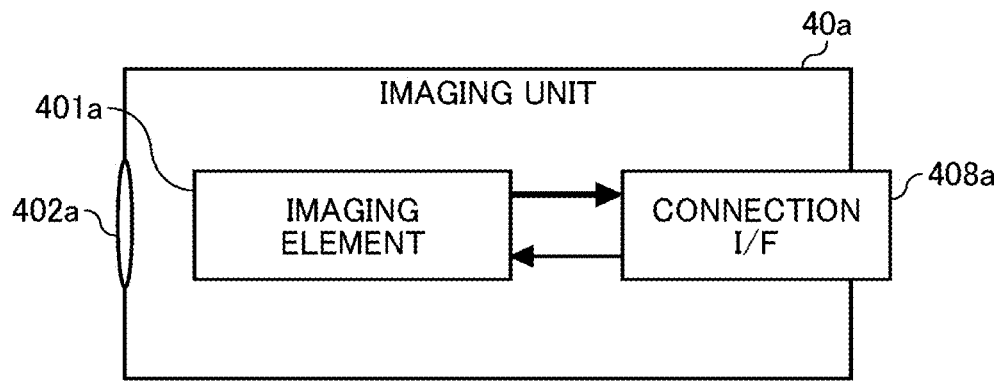
FIGS. 3A and 3B (FIG. 3) are schematic diagrams each illustrating a hardware configuration of an imaging unit, according to an embodiment.
Figure 3B:
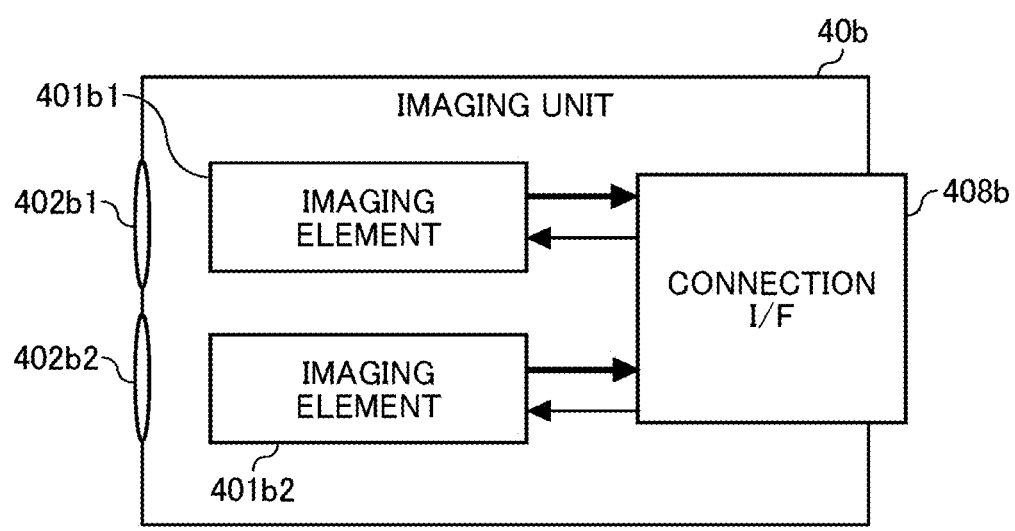

FIGS. 3A and 3B are each a schematic block diagram illustrating a hardware configuration of the imaging unit 40, according to the embodiment. Specifically, FIG. 3A illustrates a hardware configuration of a monocular imaging unit 40a, as an example of the imaging unit 40. FIG. 3B illustrates a hardware configuration of a compound eye imaging unit 40b, as an example of the imaging unit 40. The imaging unit 40 is a generic term for a plurality of types of imaging units (imaging unit 40a, 40b, etc.) having different number of imaging elements.

As illustrated in FIG. 3A, the imaging unit 40a includes an imaging element 401a such as a CMOS or a CCD, a lens 402a, and a connection I/F 408a to be electronically connected to the imaging unit I/F 313 of the real-time data processing terminal 3. When the imaging unit 40a is connected to the imaging unit I/F 313 of the real-time data processing terminal 3, the imaging element 401a captures an image according to an imaging control signal transmitted from the imaging unit I/F 313 via the connection I/F 408a. Accordingly, the imaging unit 40a illustrated in FIG. 3A obtains a planar image.

As illustrated in FIG. 3B, the imaging unit 40b includes imaging elements 401b1 and 401b2 each may be a CMOS or a CCD, lenses 402b1 and 402b2, and a connection I/F 408b to be electronically connected to the imaging unit I/F 313 of the real-time data processing terminal 3. The lenses 402b1 and 402b2 are, for example, fish-eye lenses. When the imaging unit 40b is connected to the imaging unit I/F 313 of the real-time data processing terminal 3, each of the imaging element 401b1 and 401b2 captures an image according to an imaging control signal transmitted from the imaging unit I/F 313 via the connection I/F 408b, and transmits the captured image to the imaging unit I/F 313. Accordingly, a plurality of images is transmitted as captured image data. The imaging unit 40b illustrated in FIG. 3B obtains a spherical image, which may be referred to as an equirectangular projection image as described below.

Figure 4A:
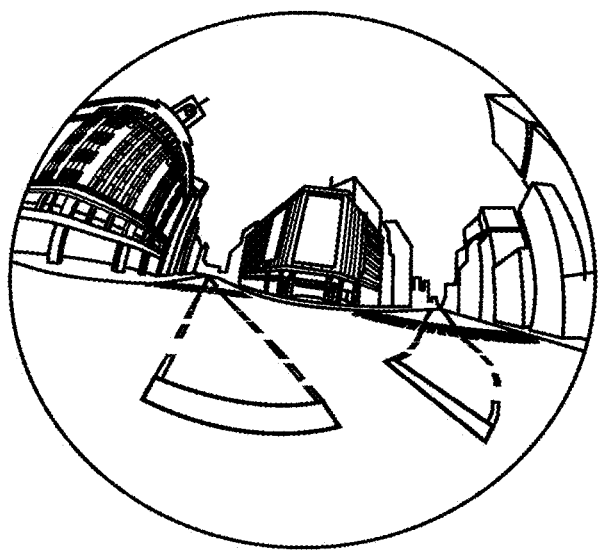
FIG. 4A is a view illustrating a hemispherical image (front side) captured by the imaging unit.

Next, referring to FIG. 4A to FIG. 8, a description is given of an overview of operation of generating an equirectangular projection image EC and a spherical image CE from the images captured by the imaging unit 40b. FIG. 4A is a view illustrating a hemispherical image (front side) captured by the imaging unit 40b. FIG. 4B is a view illustrating a hemispherical image (back side) captured by the imaging unit 40b. FIG. 4C is a view illustrating an image in equirectangular projection, which is referred to as an "equirectangular projection image" (or equidistant cylindrical projection image) EC. FIG. 5A is a conceptual diagram illustrating an example of how the equirectangular projection image maps to a surface of a sphere. FIG. 5B is a view illustrating the spherical image.

Figure 4B:
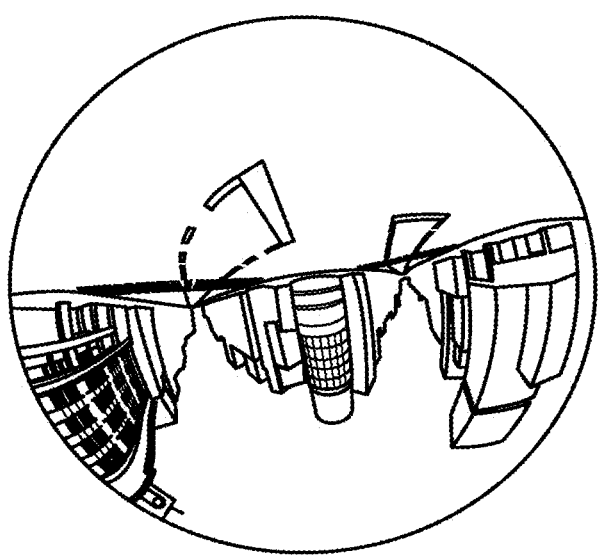
FIG. 4B is a view illustrating a hemispherical image (back side) captured by the imaging unit.
Figure 4C:
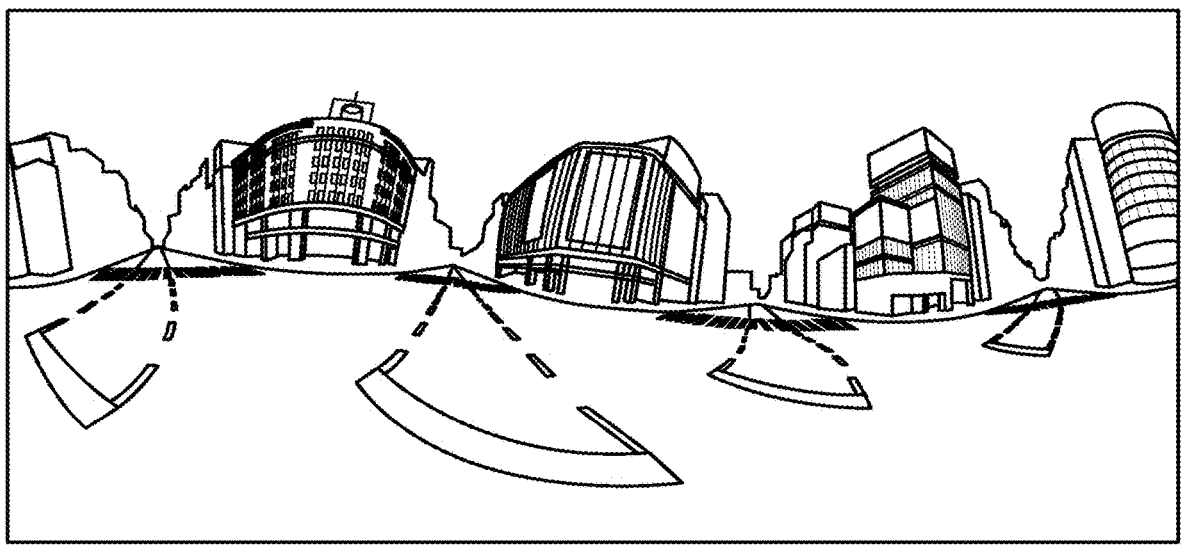
FIG. 4C is a view illustrating an image in equirectangular projection.

As illustrated in FIG. 4A, an image captured by the imaging element 401b1 is a curved hemispherical image (front side) taken through the lens 402b1. Similarly, as illustrated in FIG. 4B, an image captured by the imaging element 401b2 is a curved hemispherical image (back side) taken through the lens 402b2. The hemispherical image (front side) and the hemispherical image (back side), which are reversed by 180-degree from each other, are combined by the real-time data processing terminal 3. This results in generation of the equirectangular projection image EC as illustrated in FIG. 4C.

The equirectangular projection image is mapped on the sphere surface using Open Graphics Library for Embedded Systems (OpenGL ES) as illustrated in FIG. 5A. This results in generation of the spherical image CE as illustrated in FIG. 5B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Since the spherical image CE is an image attached to the sphere surface, as illustrated in FIG. 5B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, a part of the spherical image CE that is viewable by the user. In this disclosure, the image of the predetermined area is referred to as a "predetermined-area image" Q. While the predetermined area can be set by default at least initially, the predetermined area may be changed according to a user operation.

Hereinafter, a description is given of displaying the predetermined-area image Q with reference to FIG. 6 and FIGS. 7A and 7B.

Figure 6:
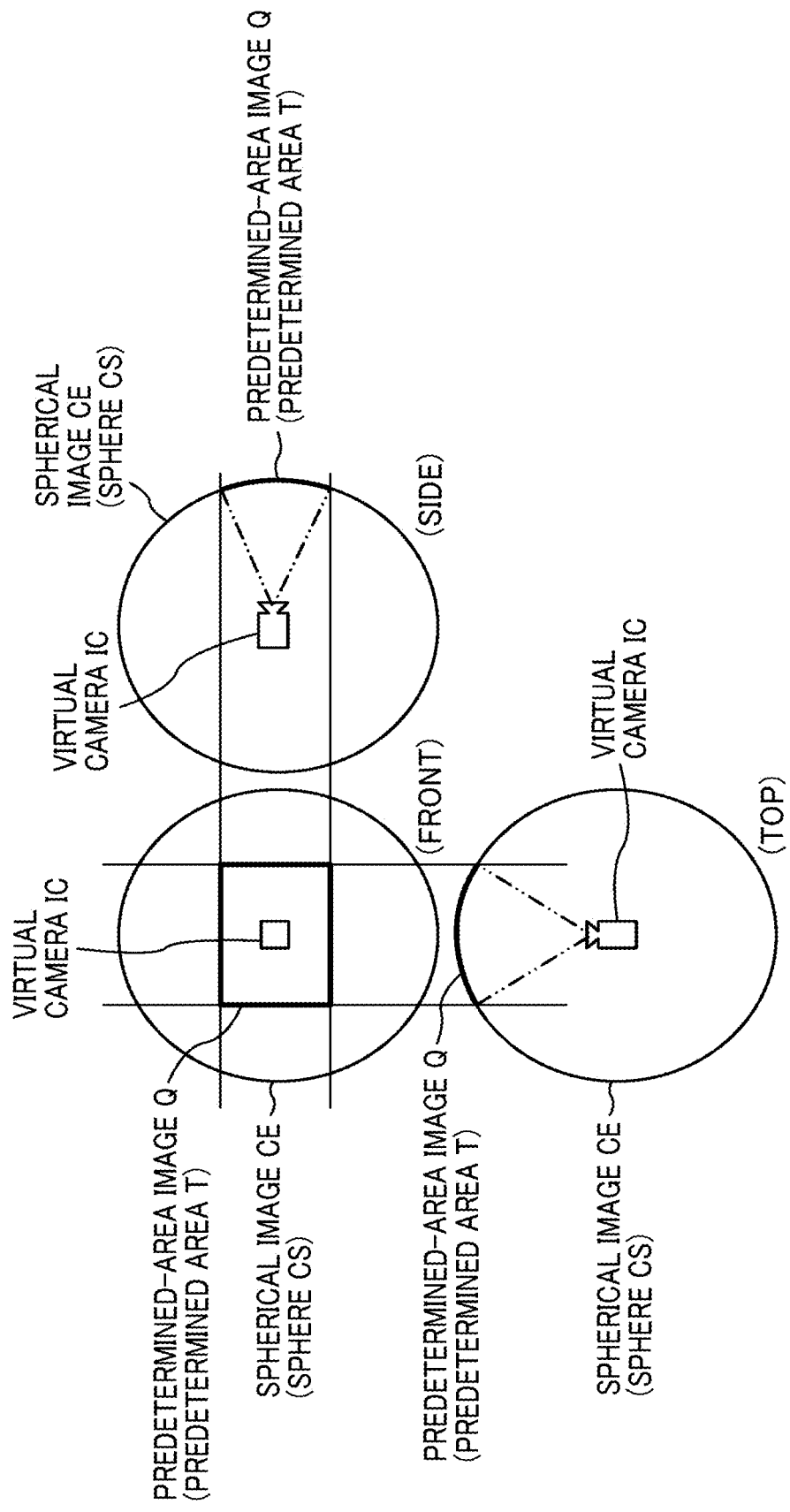
FIG. 6 is a view illustrating positions of a virtual camera IC and a predetermined area T in a case in which the spherical image is represented as a surface area of a three-dimensional solid sphere.

FIG. 6 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 7A is a perspective view of the spherical image CE illustrated in FIG. 6. FIG. 7B is a view illustrating the predetermined-area image Q when displayed on a display.

Figure 7A:
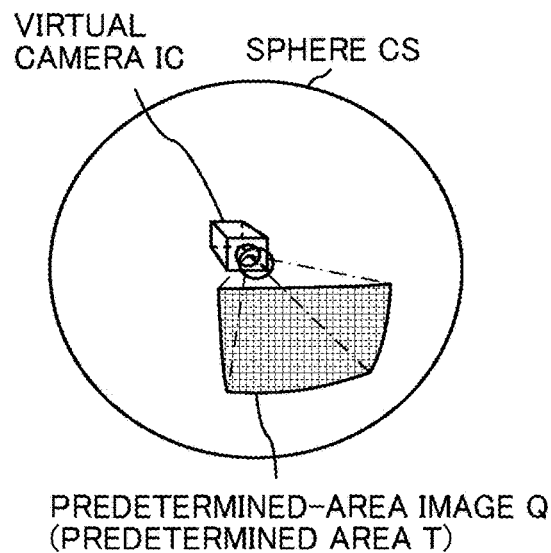
FIGS. 7A and 7B are respectively a perspective view of FIG. 6, and a view illustrating an image of the predetermined area on a display, according to an embodiment.

In FIG. 7A, the spherical image CE illustrated in FIG. 5B is represented as a surface area of the three-dimensional solid sphere CS. Assuming that the spherical image CE is a surface area of the solid sphere CS, the virtual camera IC is inside of the spherical image CE as illustrated in FIG. 6. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

Figure 7B:
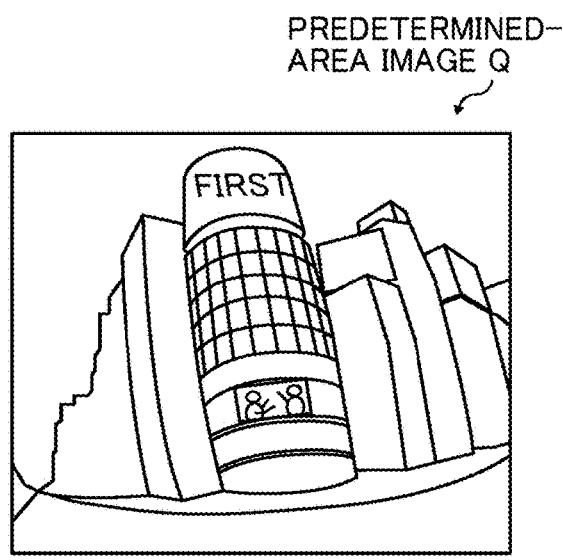

The predetermined-area image Q, which is an image of the predetermined area T illustrated in FIG. 7A, is displayed on a display as an image of an imaging area of the virtual camera IC, as illustrated in FIG. 7B. FIG. 7B illustrates the predetermined-area image Q represented by the predetermined-area information that is set by default. The following explains the position of the virtual camera IC, using an imaging direction (ea, aa) and an angle of view α of the virtual camera IC.

Figure 8:
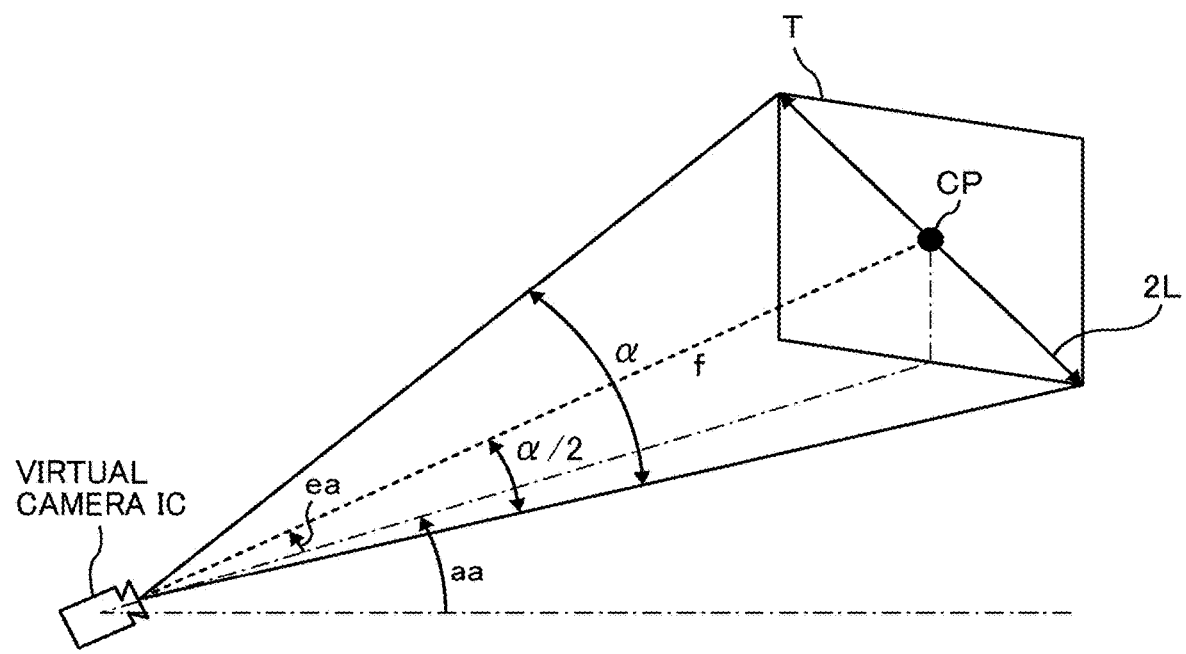
FIG. 8 is a view illustrating a relation between the predetermined-area information and the image of the predetermined area.

Referring to FIG. 8, a relation between the predetermined-area information and the image of the predetermined area T is described according to the embodiment. FIG. 8 is a view illustrating a relation between the predetermined-area information and the image of the predetermined area T. As illustrated in FIG. 8, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. L is a distance between the center point CP and a given vertex of the predetermined area T (2L is a diagonal line). In FIG. 8, a trigonometric function equation generally expressed by the following equation 1 is satisfied.

$$L/f = \tan(\alpha/2) \quad \text{(Equation 1)}$$

<Hardware Configuration of Terminal Data Processing Device>

Figure 9:
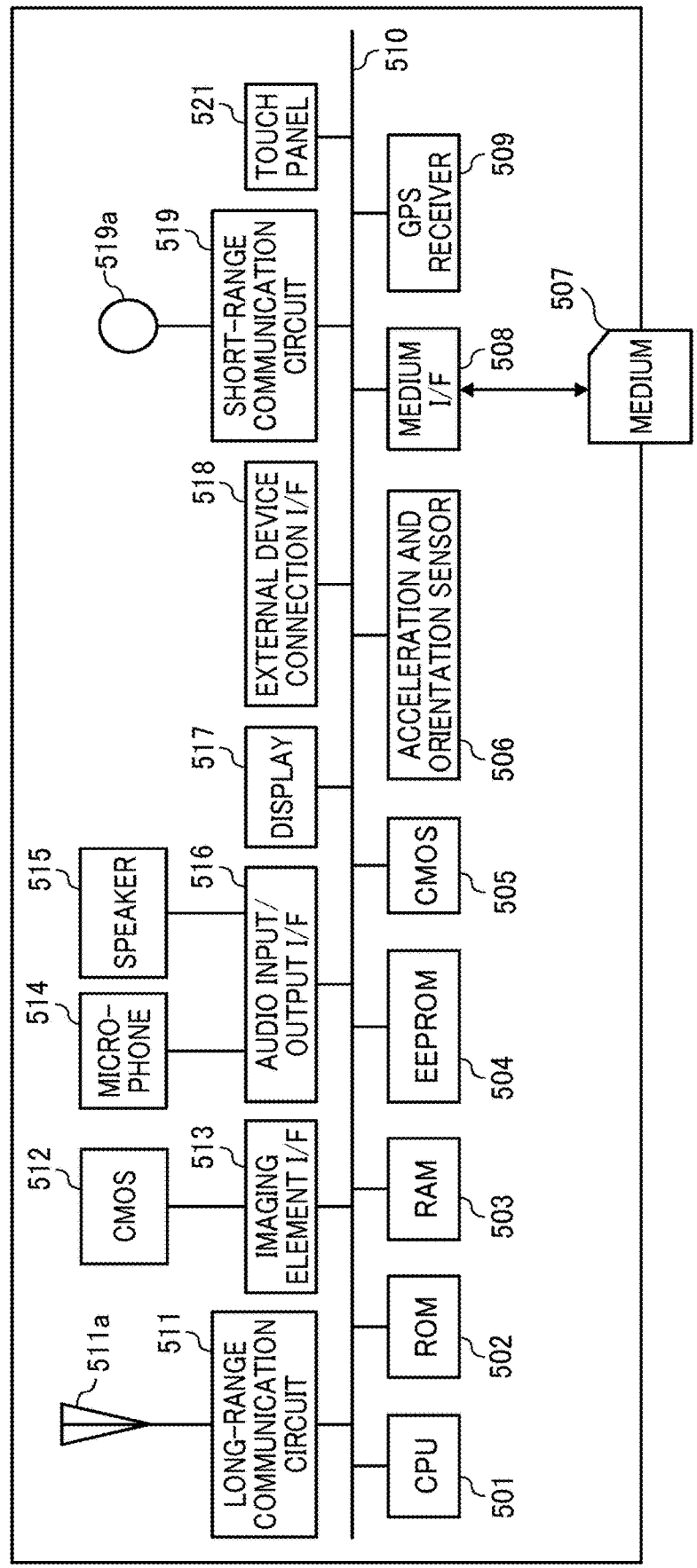
FIG. 9 is a schematic diagram illustrating a hardware configuration of the terminal data processing device, according to the embodiment.

FIG. 9 is a schematic diagram illustrating a hardware configuration of the terminal data processing device 5, according to the embodiment. As illustrated in FIG. 9, the terminal data processing device 5 includes a CPU 501, a ROM 502, a RAM 503, an EEPROM 504, a CMOS sensor 505, an acceleration and orientation sensor 506, a medium I/F 508, and a GPS receiver 509.

The CPU 501 controls entire operation of the terminal data processing device 5. The ROM 502 stores a control program for controlling the CPU 501. The RAM 503 is used as a work area for the CPU 501. The EEPROM 504 reads or writes various data such as a control program for the terminal data processing device under control of the CPU 501. The CMOS sensor 505 captures an object (for example, a self-image of the user operating the terminal data processing device 5) under control of the CPU 501 to obtain captured image data. The acceleration and orientation sensor 506 includes various sensors such as an electromagnetic compass or gyrocompass for detecting geomagnetism, and an acceleration sensor. The medium I/F 508 controls reading or writing of data with respect to a recording medium 507 such as a flash memory. The GPS receiver 509 receives a GPS signal from a GPS satellite.

The terminal data processing device 5 further includes a long-range communication circuit 511, an antenna 511a for the long-range communication circuit 511, a camera 512, an imaging element I/F 513, a microphone 514, a speaker 515, an audio input/output I/F 516, a display 517, an external device connection I/F 518, a short-range communication circuit 519, an antenna 519a for the short-range communication circuit 519, and a touch panel 521.

The long-range communication circuit 511 is a circuit that communicates with another device through the intranet 200, for example. The camera 112 is an example of built-in imaging device capable of capturing a target under control of the CPU 501. The imaging element I/F 513 is a circuit that controls driving of the camera 512. The microphone 514 is an example of audio collecting device, which is a built-in type, capable of inputting audio under control of the CPU 401. The audio I/O I/F 516 is a circuit for inputting or outputting an audio signal to the microphone 514 or from the speaker 515 under control of the CPU 501.

The display 517 may be a liquid crystal or organic electro luminescence (EL) display that displays an image of a subject, an operation icon, or the like. The external device connection I/F 518 is an interface circuit that connects the terminal data processing device 5 to various external devices. The short-range communication circuit 219 is a communication circuit that communicates in compliance with the near field radio communication (NFC) (Registered Trademark), the Bluetooth (Registered Trademark), and the like. The touch panel 521 is an example of input device that enables the user to input a user instruction to the terminal data processing device 5 through touching a screen of the display 517.

The terminal data processing device 5 further includes a bus line 510. The bus line 510 may be an address bus or a data bus, which electrically connects various elements such as the CPU 501 of FIG. 9.

<Hardware Configuration of Video Conference Terminal>

Figure 10:
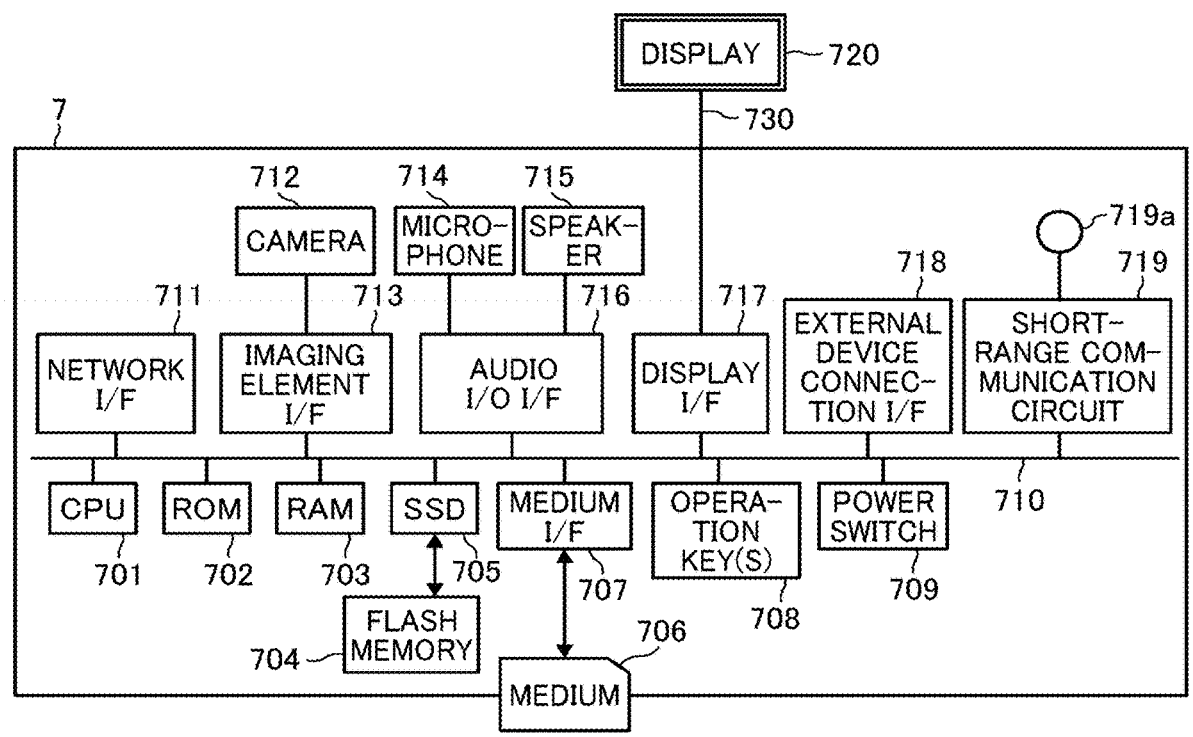
FIG. 10 is a schematic block diagram illustrating a hardware configuration of the video conference terminal, according to the embodiment.

FIG. 10 is a schematic block diagram illustrating a hardware configuration of the video conference terminal 7, according to the embodiment. As illustrated in FIG. 10, the video conference terminal 7 includes a CPU 701, a ROM 702, a RAM 703, a flash memory 704, a SSD 705, a medium I/F 707, an operation key 708, a power switch 709, a bus line 710, a network I/F 711, a camera 712, an imaging element I/F 713, a microphone 714, a speaker 115, an audio input/output I/F 716, a display I/F 717, an external device connection I/F 718, a short-range communication circuit 719, and an antenna 719a for the short-range communication circuit 719.

The CPU 701 controls entire operation of the video conference terminal 7. The ROM 702 stores a control program for controlling the CPU 701 such as an IPL. The RAM 703 is used as a work area for the CPU 701. The flash memory 704 stores various data such as a communication control program, image data, and audio data. The SSD 705 controls reading or writing of various data with respect to the flash memory 704 under control of the CPU 701. In alternative to the SSD, a hard disk drive (HDD) may be used. The medium I/F 707 controls reading or writing of data with respect to a recording medium 706 such as a flash memory. The operation key (keys) 708 is operated by a user to input a user instruction such as a user selection of a communication destination of the video conference terminal 7. The power switch 709 is a switch that receives an instruction to turn on or off the power of the video conference terminal 7.

The network I/F 711 is an interface that controls communication of data with an external device through the communication network 600. The camera 712 is an example of built-in imaging device capable of capturing a target under control of the CPU 701. The imaging element I/F 713 is a circuit that controls driving of the camera 712. The microphone 714 is an example of audio collecting device, which is a built-in type, capable of inputting audio under control of the CPU 701. The audio I/O I/F 716 is a circuit for inputting or outputting an audio signal between the microphone 714 and the speaker 715 under control of the CPU 701. The display I/F 717 is a circuit for transmitting display data to an external display 720 under control of the CPU 701. The external device connection I/F 718 is an interface circuit that connects the video conference terminal 7 to various external devices. The short-range communication circuit 719 is a communication circuit that communicates in compliance with the near field radio communication (NFC) (Registered Trademark), the Bluetooth (Registered Trademark), and the like.

The bus line 710 may be an address bus or a data bus, which electrically connects various elements such as the CPU 701 of FIG. 10.

The display 720 may be a liquid crystal or organic electroluminescence (EL) display that displays an image of a subject, an operation icon, or the like. The display 720 is connected to the display I/F 717 by a cable 732. The cable 732 may be an analog red green blue (RGB) (video graphic array (VGA)) signal cable, a component video cable, a high-definition multimedia interface (HDMI) signal cable, or a digital video interactive (DVI) signal cable. Here, it is assumed that the cable 732 is the HDMI cable. In this disclosure, the display 720 is a generic term for displays 720a and 720b to be described later. The HDMI cable 732 is a generic term for the HDMI cables 732a and 732b to be described later.

The camera 712 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

The external device connection I/F 718 is capable of connecting an external device such as an external camera, an external microphone, or an external speaker through a USB cable or the like. In the case where an external camera is connected, the external camera is driven in preference to the built-in camera 712 under control of the CPU 701. Similarly, in the case where an external microphone is connected or an external speaker is connected, the external microphone or the external speaker is driven in preference to the built-in microphone 714 or the built-in speaker 715 under control of the CPU 701.

The recording medium 706 is removable from the video conference terminal 7. The recording medium 706 can be any non-volatile memory that reads or writes data under control of the CPU 301, such that any memory such as an EEPROM may be used instead of the flash memory 704.

<Hardware Configuration of Electronic Whiteboard>

Figure 11:
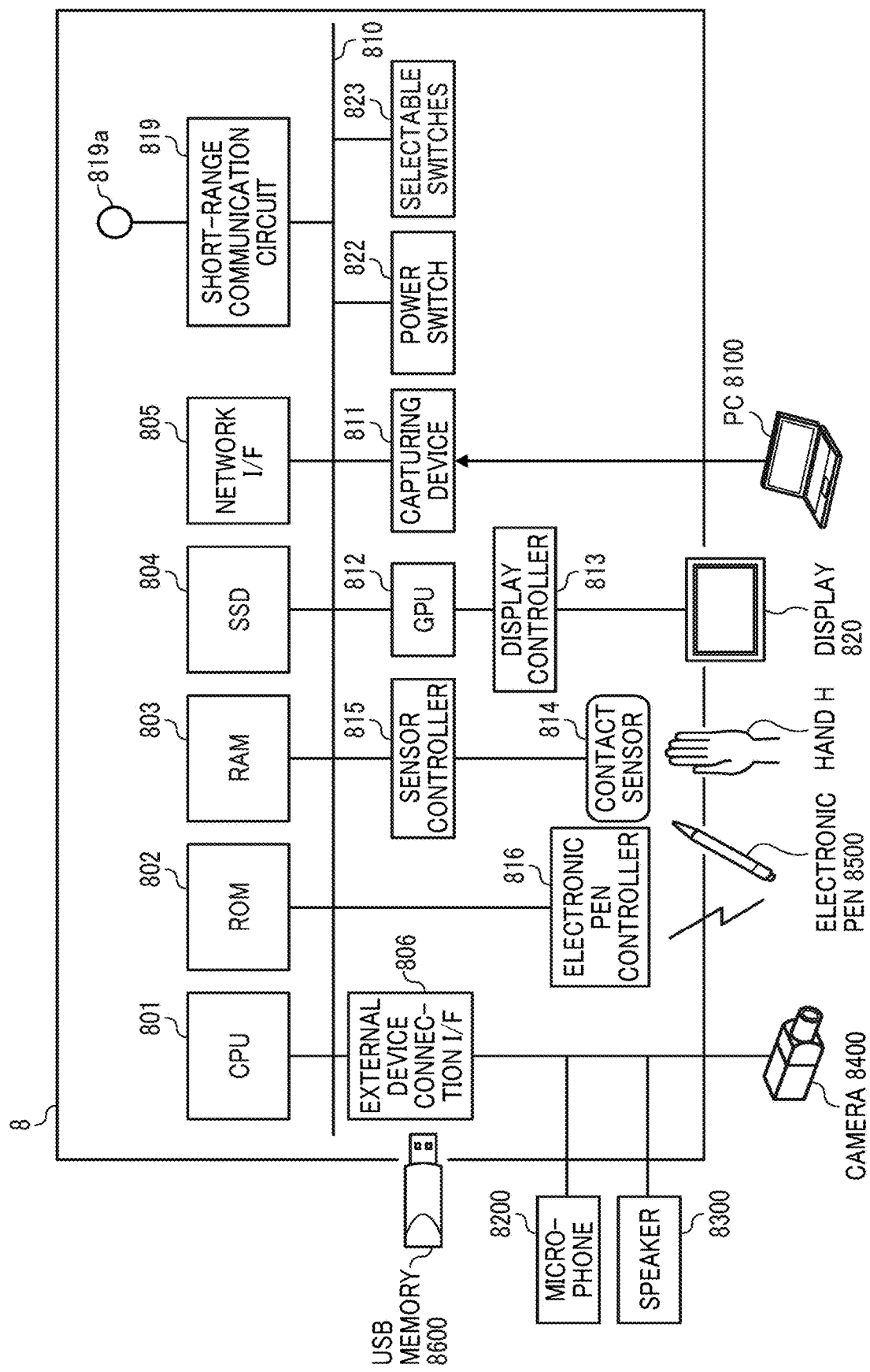
FIG. 11 is a schematic block diagram illustrating a hardware configuration of the electronic whiteboard, according to the embodiment.

FIG. 11 is a schematic block diagram illustrating a hardware configuration of the electronic whiteboard 8, according to the embodiment. As illustrated in FIG. 11, the electronic whiteboard 8 includes a central processing unit (CPU) 801, a read only memory (ROM) 802, a random access memory (RAM) 803, a solid state drive (SSD) 804, a network interface (I/F) 805, and an external device connection interface (I/F) 806.

The CPU 801 controls entire operation of the electronic whiteboard 8. The ROM 802 stores a control program for controlling the CPU 801 such as an IPL. The RAM 803 is used as a work area for the CPU 801. The SSD 804 stores various data such as the control program for the electronic whiteboard 8. The network I/F 805 controls communication with an external device through the communication network 600. The external device connection I/F 806 controls communication with an external resource such as a PC 8100, a USB memory 8600, a microphone 8200, a speaker 8300, and a camera 8400.

The electronic whiteboard 8 further includes a capturing device 811, a graphics processing unit (GPU) 812, a display controller 813, a contact sensor 814, a sensor controller 815, an electronic pen controller 816, a short-range communication circuit 819, an antenna 819a for the short-range communication circuit 819, a power switch 822, and selectable switches 823.

The capturing device 811 captures an image being displayed at the external PC 8100 to display the captured image on the display 820. The GPU 812 is a semiconductor chip dedicated to processing a graphical image. The display controller 813 controls display of an image processed at the GPU 812 for output through the display 820 provided with the electronic whiteboard 8. The contact sensor 814 detects a touch onto the display 820 with a electronic pen 8500 or a user's hand H. The sensor controller 815 controls operation of the contact sensor 814. The contact sensor 814 senses a touch input to a specific coordinate on the display 820 using the infrared blocking system.

More specifically, the display 820 is provided with two light receiving elements disposed on both upper side ends of the display 820, and a reflector frame surrounding the sides of the display 820. The light receiving elements emit a plurality of infrared rays in parallel to a surface of the display 820. The light receiving elements receive lights passing in the direction that is the same as an optical path of the emitted infrared rays, which are reflected by the reflector frame. The contact sensor 814 outputs an identifier (ID) of the infrared ray that is blocked by an object (such as the user's hand) after being emitted from the light receiving elements, to the sensor controller 815. Based on the ID of the infrared ray, the sensor controller 815 detects a specific coordinate that is touched by the object. The electronic pen controller 816 communicates with the electronic pen 8500 to detect a touch by the tip or bottom of the electronic pen 8500 to the display 820.

The short-range communication circuit 819 is a communication circuit that communicates in compliance with the NFC, the Bluetooth, and the like. The power switch 822 turns on or off the power of the electronic whiteboard 8. The selectable switches 823 are a group of switches for adjusting, for example, brightness and color of a screen displayed on the display 820.

The electronic whiteboard 8 further includes a bus line 810. The bus line 810 may be an address bus or a data bus, which electrically connects various elements such as the CPU 801 of FIG. 11.

The contact sensor 814 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 8500, the electronic pen controller 816 may also detect a touch by another part of the electronic pen 8500, such as a part held by a hand of the user.

<Hardware Configuration of PC>

Figure 12:
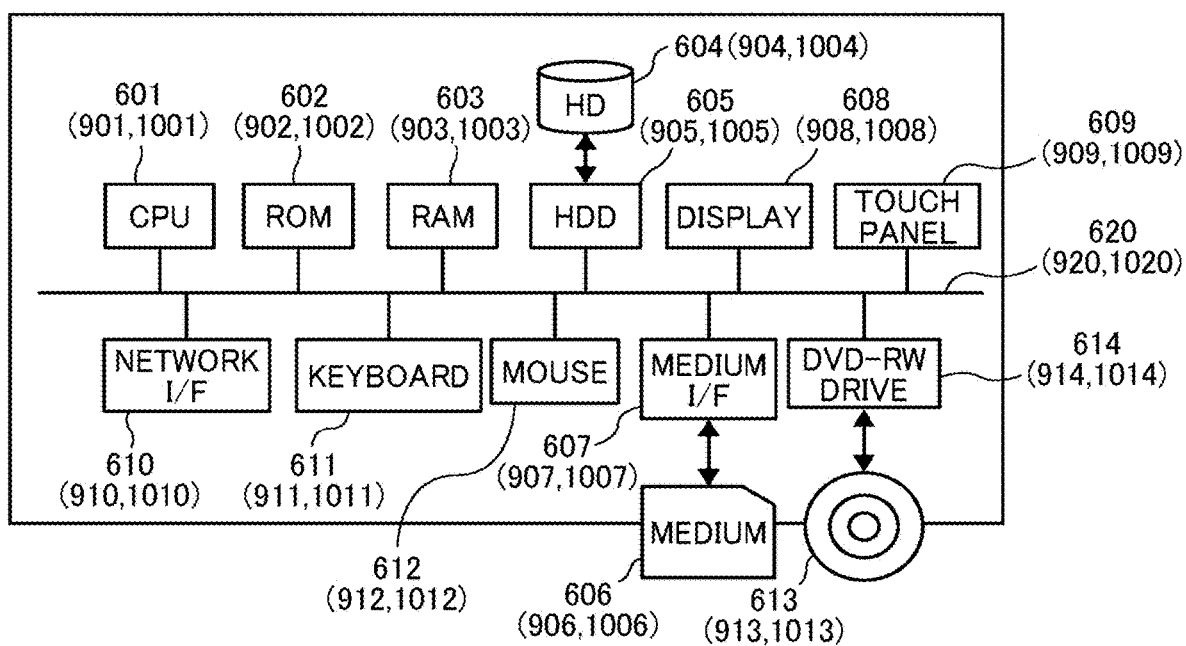
FIG. 12 is a schematic block diagram illustrating a hardware configuration of a communication management server and a relay device of the communication system of FIG. 1.

FIG. 12 is a schematic block diagram illustrating a hardware configuration of the PC 6, according to the embodiment. Referring to FIG. 12, the PC 6 includes a CPU 601, a ROM 602, a RAM 603, a HD 604, a HDD 605, a medium I/F 607, a display 608, a touch panel 609, a network I/F 610, a keyboard 611, a mouse 612, a Digital Versatile Disk Rewritable (DVD-RW) drive 614, and a bus line 620.

The CPU 601 controls entire operation of the PC 6. The ROM 602 stores a control program for controlling the CPU 601. The RAM 603 is used as a work area for the CPU 601. The HD 604 stores various data such as a control program. The HDD 605 controls reading or writing of various data to or from the HD 604 under control of the CPU 601. The medium I/F 607 controls reading or writing of data with respect to a recording medium 606 such as a flash memory.

The display 608 displays various information such as a cursor, menu, window, characters, or image. The touch panel 609 is an example of input device that enables the user to input a user instruction to the PC 6 through touching a screen of the display 608. The network I/F 610 is an interface that controls communication of data with an external device through the communication network 600. The keyboard 611 is one example of input device provided with a plurality of keys for allowing a user to input characters, numerals, or various instructions. The mouse 612 is one example of input device for allowing the user to select a specific instruction or execution, select a target for processing, or move a curser being displayed. The DVD-RW drive 614 reads or writes various data with respect to a DVD ReWritable (DVD-RW) 613, which is one example of removable recording medium. In alternative to the DVD-RW, any recording medium may be used such as a DVD-R, Blu-ray Disc (Blu-ray Disc), etc.

The PC 6 further includes a bus line 620. The bus line 620 may be an address bus or a data bus, which electrically connects various elements such as the CPU 601 of FIG. 12.

<Hardware Configuration of Communication Management Server>

FIG. 12 is a schematic block diagram illustrating a hardware configuration of the communication management server 9, according to the embodiment. Referring to FIG. 12, the communication management server 9, which is implemented by the general-purpose computer, includes a CPU 901, a ROM 902, a RAM 903, a HD 904, a HDD 905, a medium I/F 907, a display 908, a touch panel 909, a network I/F 910, a keyboard 911, a mouse 912, a CD-RW drive 914, and a bus line 920. Since the communication management server 9 operates as a server, an input device such as the keyboard 911 and the mouse 912, or an output device such as the display 908 does not have to be provided.

The CPU 901 controls entire operation of the communication management server 9. The ROM 902 stores a control program for operating the CPU 901. The RAM 903 is used as a work area for the CPU 901. The HD 904 stores various data such as a control program. The HDD 905 controls reading or writing of various data to or from the HD 904 under control of the CPU 901. The medium I/F 907 controls reading or writing of data with respect to a recording medium 906 such as a flash memory.

The display 908 displays various information such as a cursor, menu, window, characters, or image. The touch panel 909 is an example of input device that enables the user to input a user instruction to the communication management server 9 through touching a screen of the display 908. The network I/F 910 is an interface that controls communication of data with an external device through the communication network 600. The keyboard 911 is one example of input device provided with a plurality of keys for allowing a user to input characters, numerals, or various instructions. The mouse 912 is one example of input device for allowing the user to select a specific instruction or execution, select a target for processing, or move a curser being displayed. The CD-RW drive 914 reads or writes various data with respect to a Compact Disc ReWritable (CD-RW) 913, which is one example of removable recording medium.

The communication management server 9 further includes a bus line 920. The bus line 920 is an address bus or a data bus, which electrically connects the elements in FIG. 12 such as the CPU 901.

<Hardware Configuration of Relay Device>

The relay device 10 basically has the same configuration as the communication management server 9.

Referring to FIG. 12, the relay device 10, which is implemented by the general-purpose computer, includes a CPU 1001, a ROM 1002, a RAM 1003, a HD 1004, a HDD 1005, a medium I/F 1007, a display 1008, a touch panel 1009, a network I/F 1010, a keyboard 1011, a mouse 1012, a CD-RW drive 1014, and a bus line 1020.

Since the relay device 10 operates as a router, an input device such as the keyboard 1011 and the mouse 1012, or an output device such as the display 1008 does not have to be provided.

Since the CPU 1001, ROM 1002, RAM 1003, HD 1004, HDD 1005, recording medium 1006, medium I/F 1007, display 1008, touch panel 1009, network I/F 1010, keyboard 1011, mouse 1012, CD-RW drive 1014, and bus line 1020, are substantially similar in structure to the CPU 901, ROM 902, RAM 903, HD 904, HDD 905, recording medium 906, medium I/F 907, display 908, touch panel 909, network I/F 910, keyboard 911, mouse 912, CD-RW drive 914, and bus line 920, respectively, description thereof is omitted.

[Functional Configuration of Communication System]

Figure 13A:
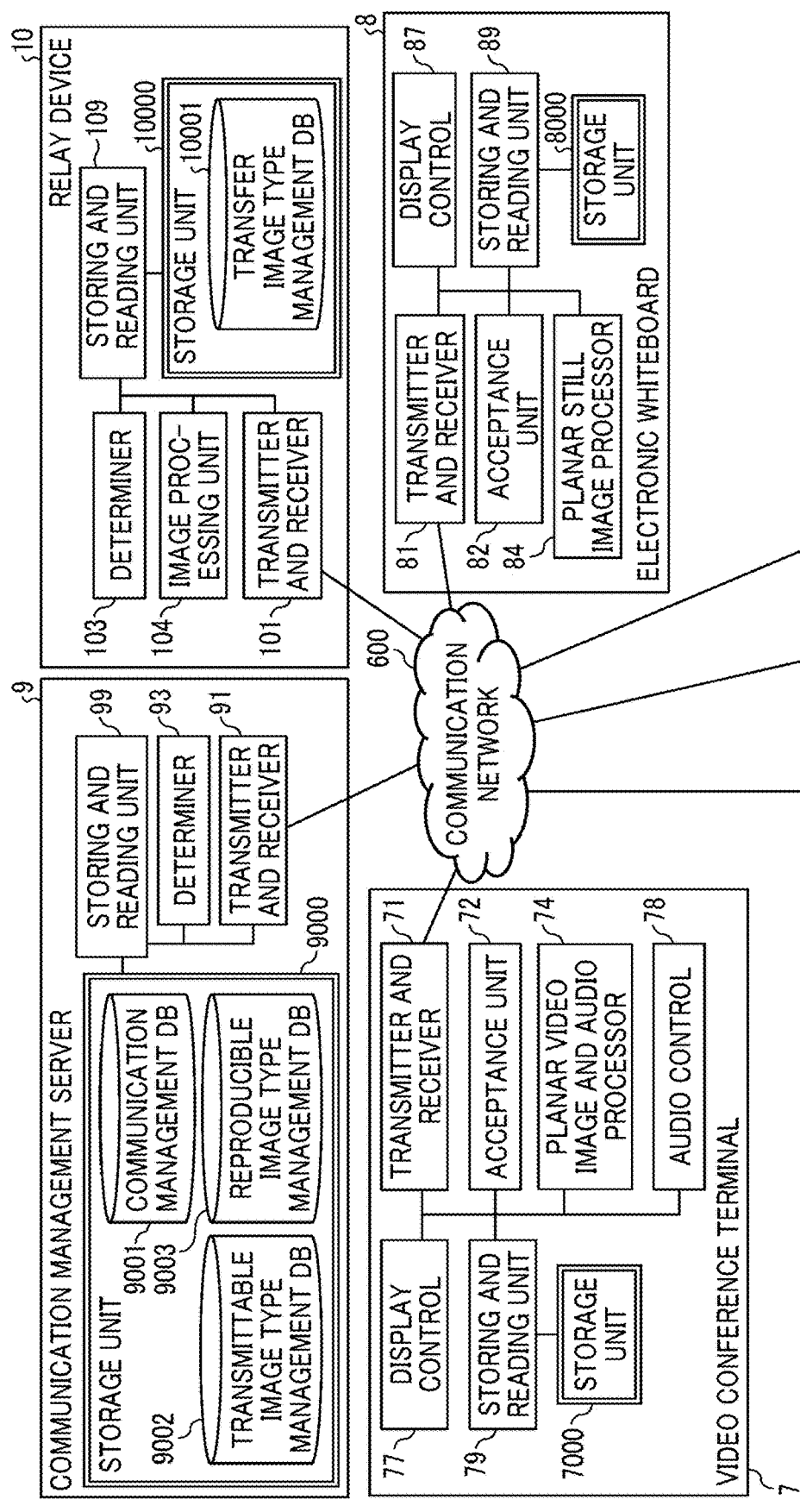
FIGS. 13A and 13B (FIG. 13) are a schematic block diagram illustrating a functional configuration of the communication system according to the embodiment.
Figure 13B:
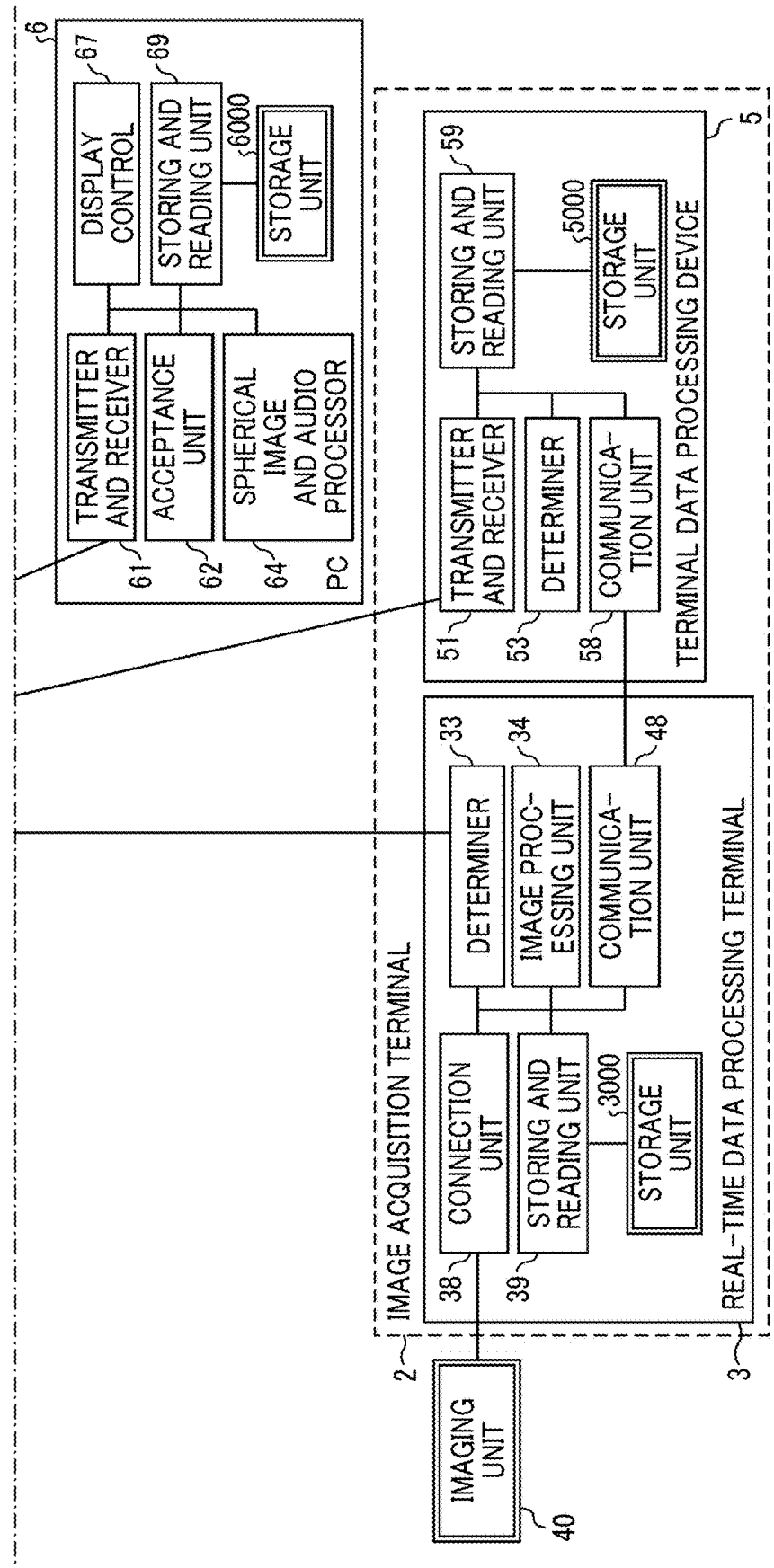

Referring now to the drawings, a functional configuration of the communication system 1 is described according to the embodiment. First, referring to FIG. 13 and FIG. 14, functional configurations of terminals, apparatuses, and servers in the communication system 1 are described, according to the embodiment. FIG. 13 is a diagram illustrating a functional configuration of the communication system 1.

<Functional Configuration of Real-Time Data Processing Terminal>

Referring to FIG. 13, the real-time data processing terminal 3 includes a determiner 33, an image processing unit 34, a connection unit 38, a storing and reading unit 39, and a communication unit 48. These units are functions that are implemented by or that are caused to function by operating any of the hardware components illustrated in FIG. 2 in cooperation with the instructions of the CPU 301 according to the control program expanded from the EEPROM 304 to the RAM 303.

The real-time data processing terminal 3 further includes a storage unit 3000, which is implemented by the ROM 302, the RAM 303, and/or the EEPROM 304 illustrated in FIG. 2.

Referring to FIG. 13, a functional configuration of the real-time data processing terminal 3 is described according to the embodiment. The determiner 33, which is implemented by instructions of the CPU 301, performs various determinations. The image processing unit 34, which is implemented by instructions of the CPU 301, digitizes an image input from the imaging unit 40 to generate at least one of video image data and still image data. For example, the image processing unit 34 generates video image data in real time (for example, 1/60 second interval) or generates still image data. The connection unit 38, which is implemented by the imaging unit I/F 313 and the instructions of the CPU 301, is an interface for mechanically and electrically connecting the imaging unit 40 to the real-time data processing terminal 3. The storing and reading unit 39, which is implemented by instructions of the CPU 301, stores various data or information in the storage unit 3000 or reads out various data or information from the storage unit 3000. The communication unit 48, which is implemented by the external device connection I/F 318 and the instructions of the CPU 301, transmits or receives various data (or information) to or from the communication unit 58 of the terminal data processing device 5. The one-to-one communication between the communication unit 48 and the communication unit 58 may be performed via a wired network or a wireless network.

<Functional Configuration of Terminal Data Processing Device>

As illustrated in FIG. 13, the terminal data processing device 5 includes a transmitter and receiver 51, a determiner 53, a communication unit 58, and a storing and reading unit 59. These units are functions that are implemented by or that are caused to function by operating any of the elements illustrated in FIG. 9 in cooperation with the instructions of the CPU 501 according to the control program expanded from the EEPROM 504 to the RAM 503. The terminal data processing device 5 further includes a storage unit 5000, which is implemented by the ROM 502, RAM 503 and EEPROM 504 illustrated in FIG. 9.

Referring to FIG. 13, a functional configuration of the terminal data processing device 5 is described according to the embodiment. The transmitter and receiver 51 of the terminal data processing device 5, which is implemented by the long-range communication circuit 511, the antenna 511a, and the instructions of the CPU 501, transmits or receives various data (or information) to or from another terminal, device, or server via the communication network 600. The determiner 53, which is implemented by instructions of the CPU 501, performs various determinations. The communication unit 58, which is implemented by the external device connection I/F 518, and the instructions of the CPU 501, transmits or receives various data (or information) to or from the communication unit 48 of the real-time data processing terminal 3. The one-to-one communication between the communication unit 58 and the communication unit 48 may be performed via a wired network or a wireless network. The storing and reading unit 59, which is implemented by instructions of the CPU 501, stores various data or information in the storage unit 5000 or reads out various data or information from the storage unit 5000.

<Functional Configuration of PC>

As illustrated in FIG. 13, the PC 6 includes a transmitter and receiver 61, an acceptance unit 62, a spherical image and audio processor 64, a display control 67, and a storing and reading unit 69.

These units are functions that are implemented by or that are caused to function by operating any of the hardware components illustrated in FIG. 11 in cooperation with the instructions of the CPU 601 according to the control program expanded from the HD 604 to the RAM 603. The PC 6 further includes a storage unit 6000, which is implemented by the ROM 602, RAM 603, or HD 604 as illustrated in FIG. 11.

The transmitter and receiver 61 of the PC 6, which is implemented by the network I/F 610 and the instructions of the CPU 601, transmits or receives various data (or information) to or from another terminal, apparatus, or server via the communication network 600.

The acceptance unit 62 is implemented by the keyboard 611 or mouse 612, which operates under control of the CPU 601, to receive various selections or inputs from the user. The spherical image and audio processor 64 processes spherical video image data received from the relay device 10 to display a spherical video image on the display 608, and processes audio data received from the relay device 10 to output audio through an external speaker.

The spherical image and audio processor 64 is capable of reproducing spherical still image data, planar video image data, and planar still image data, in addition to spherical video image data.

The display control 67, which is implemented by the instructions of the CPU 601 of the PC 6, controls the display 608 to display various types of image, such as a spherical video image, spherical still image, planar video image, or planar still image.

The storing and reading unit 69, which is implemented by instructions of the CPU 601 of the PC 6, stores various data or information in the storage unit 6000 or reads out various data or information from the storage unit 6000.

<Functional Configuration of Video Conference Terminal>

As illustrated in FIG. 13, the video conference terminal 7 includes a transmitter and receiver 71, an acceptance unit 72, a planar video image and audio processor 74, a display control 77, an audio control 78, and a storing and reading unit 79.

These units are functions that are implemented by or that are caused to function by operating any of the elements of the video conference terminal 7 illustrated in FIG. 10 in cooperation with the instructions of the CPU 701 according to the control program expanded from the flash memory 704 to the RAM 703. The video conference terminal 7 further includes a storage unit 7000, which is implemented by the ROM 702, RAM 703, or flash memory 704 of FIG. 10.

The transmitter and receiver 71 of the video conference terminal 7, which is implemented by the network I/F 711 and the instructions of the CPU 701, transmits or receives various data (or information) to or from other server, apparatus, terminal, or device via a communication network 600. The acceptance unit 72, which is implemented by the operation key 708, operating under control of the CPU 701, receives various selections or inputs from the user.

The planar video image and audio processor 74 processes planar video image data received from the relay device 10 to display video at the display 720, and processes audio data received from the relay device 10 to output audio through the speaker 715. The planar video image and audio processor 74 is not capable of reproducing spherical video image data, spherical still image data, and planar still image data.

The display control 77, which is implemented by the instructions of the CPU 701 of the video conference terminal 7, controls the display 720 to display various types of image, such as the planar video image. The audio control 78, which is implemented by the instructions of the CPU 701 of the video conference terminal 7, controls collection of audio at the microphone 714 or output of audio through the speaker 715. The storing and reading unit 79, which is implemented by instructions of the CPU 701 of the video conference terminal 7, stores various data or information in the storage unit 7000 or reads out various data or information from the storage unit 7000.

<Functional Configuration of Electronic Whiteboard>

As illustrated in FIG. 13, the electronic whiteboard 8 includes a transmitter and receiver 81, an acceptance unit 82, a planar still image processor 84, a display control 87, and a storing and reading unit 89.

These units are functions that are implemented by or that are caused to function by operating any of the hardware components of the electronic whiteboard 8 illustrated in FIG. 11 in cooperation with the instructions of the CPU 801 according to the control program expanded from the SSD 804 to the RAM 803. The electronic whiteboard 8 further includes a storage unit 8000, which is implemented by the ROM 802, RAM 803, or SSD 804 of FIG. 11.

The transmitter and receiver 81 of the electronic whiteboard 8, which is implemented by the I/F 805 and the instructions of the CPU 801, transmits or receives various data (or information) to or from another terminal, apparatus, or server via the communication network 600. The acceptance unit 82, which is implement by the selectable switches 823 of the electronic whiteboard 8, operating under control of the CPU 801, receives various selections or inputs from the user.

The planar still image processor 84 processes the planar still image data transmitted from the relay device 10 to display a planar still image on the display 820. The planar still image processor 84 is not capable of reproducing spherical video image data, spherical still image data, and planar video image data. In a substantially similar manner for the planar video image and audio processor 74, the planar still image processor 84 may be provided with capability of reproducing audio data received from the relay device 10 to output audio through the speaker 8300.

The display control 87, which is implemented by the instructions of the CPU 801 of the electronic whiteboard 8, controls the display 820 to display various types of image, such as a planar still image.

The storing and reading unit 89, which is implemented by instructions of the CPU 801 of the electronic whiteboard 8, stores various data or information in the storage unit 8000 or reads out various data or information from the storage unit 8000.

<Functional Configuration of Communication Management Server 9>

As illustrated in FIG. 13, the communication management server 9 includes a transmitter and receiver 91, a determiner 93, and a storing and reading unit 99. These units are functions that are implemented by or that are caused to function by operating any of the hardware components illustrated in FIG. 12 in cooperation with the instructions of the CPU 901 according to the control program expanded from the HD 904 to the RAM 903. The communication management server 9 further includes a storage unit 9000, which is implemented by the ROM 902, the RAM 903 and the HD 904 illustrated in FIG. 12.

The storage unit 9000 stores therein a communication management DB (database) 9001, a transmittable image type management DB 9002, and a reproducible image type management DB 9003. The communication management DB 9001 is implemented by a communication management table of FIG. 14A. The transmittable image type management DB 9002 is implemented by a transmittable image type management table of FIG. 14B. The reproducible image type management DB 9003 is implemented by a reproducible image type management table of FIG. 14C.

FIG. 14A is a conceptual diagram illustrating an example communication management table. The communication management table includes a device ID for identifying a transmission source ("sender"), and a device ID for identifying a transmission destination ("receiver"), in association. As described below, in one example, the communication management table stores, for each session that has been established, a device ID of a sender that transmits image data, and a device of a receiver that receives image data.

FIG. 14B is a conceptual diagram illustrating an example transmittable image type management table. The transmittable image management table stores a device ID for identifying a transmission source, and a type of image that is transmittable by the transmission source. "None" in the table represents a state in which no value is set. "V3" represents a three-dimensional, spherical video image. "V2" represents a two-dimensional, planar video image. "S" represents a two-dimensional, planar still image. When the transmission source is in an initial state, and has not yet transmitted image data, no information regarding a type of transmittable image is stored in the table, such that the value is set to "None". For example, the initial state may be a state in which the transmission source in the communication system 1 has just established a communication session with a transmission destination, and no data has been exchanged through the communication session.

FIG. 14C is a conceptual diagram illustrating an example reproducible image type management table. The reproducible image type management table includes a device ID for identifying a transmission destination ("receiver"), and a type of image that is reproducible by the transmission destination. Information on the type of image reproducible by each device as a receiver is previously stored, for example, for each apparatus that can be a receiver according to a user operation.

Information on a type of image that is transmittable by the transmission source, which is stored in the transmittable image type management table of FIG. 14B, is dynamically changed, according to a request from the transmission destination (that is, the receiver), as described below referring to FIG. 15.

The table in FIG. 14B illustrates the case where the type of transmittable image for the image acquisition terminal 2 identified with the device ID "01aa" is changed from "None" to "S", and further changed from "S" to "S, V2". In this disclosure, the device ID of the transmission source (sender) is an example of sender identifier.

Next, referring to FIG. 13, a functional configuration of the communication management server 9 is described in detail. The transmitter and receiver 91 of the communication management server 9, which is implemented by the network I/F 711 and the instructions of the CPU 701, transmits or receives various data (or information) to or from other server, apparatus, terminal, or device via a communication network 600. The determiner 93, which is implemented by instructions of the CPU 901, performs various determinations. The storing and reading unit 99, which is implemented by instructions of the CPU 901, stores various data or information in the storage unit 9000 or reads out various data or information from the storage unit 9000.

<Functional Configuration of Relay Device>

As illustrated in FIG. 13, the relay device 10 includes a transmitter and receiver (transferrer) 101, a determiner 103, an image processing unit 104, and a storing and reading unit 109.

These units are functions that are implemented by or that are caused to function by operating any of the hardware components illustrated in FIG. 12 in cooperation with the instructions of the CPU 901 according to the control program expanded from the HD 904 to the RAM 903. The relay device 30 further includes a storage unit 10000 implemented by the ROM 902, RAM 903, and HD 904 illustrated in FIG. 12. The storage unit 10000 includes a transfer image type management DB 10001. The transfer image type management DB 10001 is implemented by a transfer image type management table, which is described below.

FIG. 14D is a conceptual diagram illustrating an example transfer image type management table. The transfer image type management table includes a device ID for identifying a transmission source (sender), a device ID for identifying a transmission destination (receiver) capable of reproducing spherical video image data, a device ID of a receiver capable of reproducing planar video image data, and a device ID of a receiver capable of reproducing planar still image data, in association. The device ID of the transmission destination (receiver) is an example of receiver identifier.

Referring to FIG. 13, a functional configuration of the relay device 10 is described in detail. The transmitter and receiver 101 of the relay device 10, which is implemented by the network I/F 1010 and the instructions of the CPU 1001, transmits or receives various data (or information) to or from other server, apparatus, terminal, or device via a communication network 600.

The determiner 103, which is implemented by instructions of the CPU 1001, performs various determinations. The image processing unit 104 performs image processing on spherical video image data, planar video image data, and planar still image data. The image processing unit 104 may perform image processing on spherical still image data.

The storing and reading unit 109, which is implemented by instructions of the CPU 1001, stores various data or information in the storage unit 10000 or reads out various data or information from the storage unit 10000.

[Operation]

Referring to FIGS. 15 to 18, operation of managing image types to be processed, performed by the communication system 1, is described according to the embodiment. FIG. 15 is a data sequence diagram illustrating example operation of transmitting and receiving image data, between the image acquisition terminal 2 as a sender, and the electronic whiteboard 8 and the video conference terminal 7 each being a receiver.

Accordingly, when a communication session is established, the communication management server 9 creates a new entry in the communication management table of FIG. 14A, which includes the device ID "01aa" of the image acquisition terminal 2 in the "device ID of sender" field, and the device ID "02aa" of the electronic whiteboard 8 and the device ID "02ab" of the video conference terminal 7 in the "device ID of receiver" field.

The following assumes that the imaging unit 40b in FIG. 3 is connected to the real-time data processing terminal 3, and the real-time data processing terminal 3 acquires the spherical video image data from the imaging unit 40b. For the descriptive purposes, description on acquisition of audio data is omitted. While the image acquisition terminal 2 is capable of transmitting spherical video image data, one or more devices at the receiver side may not be able to process spherical video image data.

More specifically, as indicated by the reproducible image type management table of FIG. 14C, the electronic whiteboard 8 with the device ID "02aa" is capable of reproducing planar still image data ("S"), but not capable of reproducing spherical video and still image data, and planar still video data. The video conference terminal 7 with the device ID "02ab" is capable of reproducing planar video image data ("V2"), but not capable of reproducing planar still image data and spherical video and still image data.

First, the case where the electronic whiteboard 8 sends a request for transmission of image data is described.

As illustrated in FIG. 15, at the electronic whiteboard 8, as the power switch 822 is turned on, the transmitter and receiver 81 of the electronic whiteboard 8 transmits a notification indicating that the electronic whiteboard 8 is ready to receive image data, to the communication management server 9 (S11). This notification includes a device ID of a transmission source (sender) for identifying a request transmission target, and a device ID of a request transmission source (receiver). The request transmission source, which is the receiver, is any device that has sent the notification indicating that image data can be received, when starting communication with the request transmission target (sender). In this specific example, the electronic whiteboard 8 is the receiver, and the image acquisition terminal 2 is sender. The transmitter and receiver 91 of the communication management server 9 receives the notification indicating that image data can be received.

The transmitter and receiver 91 of the communication management server 9 transmits a transmission start request for requesting to start transmission of image data, to the terminal data processing device 5, via the communication network 600 (S12). The transmitter and receiver 51 of the terminal data processing device 5 receives the transmission start request.

Next, the determiner 53 of the terminal data processing device 5 determines whether to request transmission of image data (S13).

Figure 16:
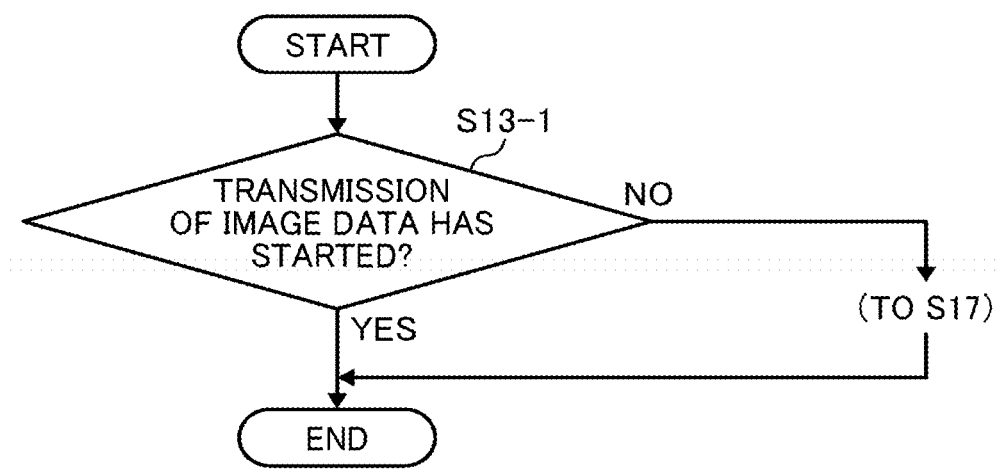
FIG. 16 is a flowchart illustrating operation of determining transmission of image data according to an embodiment.

Referring to FIG. 16, S13 of determining whether to request transmission of image data is described as an example. FIG. 16 is a flowchart illustrating processing to determine whether to request transmission of image data according to an example. As illustrated in FIG. 16, the determiner 53 determines whether transmission of image data has been started (S13-1). When transmission of image data has been started ("YES" at S13-1), S13 ends. In such case, the operation does not proceed to S17. When transmission of image data has not started ("NO" at S13-1), operation proceeds to S17 to transmit a transmission start request to the terminal data processing device 5. With this transmission start request, the image acquisition terminal 2 starts transmission of image data, in case transmission of image data has not been started.

This processing of S13 is optional, as the image acquisition terminal 2 is programmed to constantly transmit the image data to the relay device 10.

In response to receiving the notification at S11, the communication management server 9 determines a type of image data that can be received at the transmission destination (S14).

Figure 17:
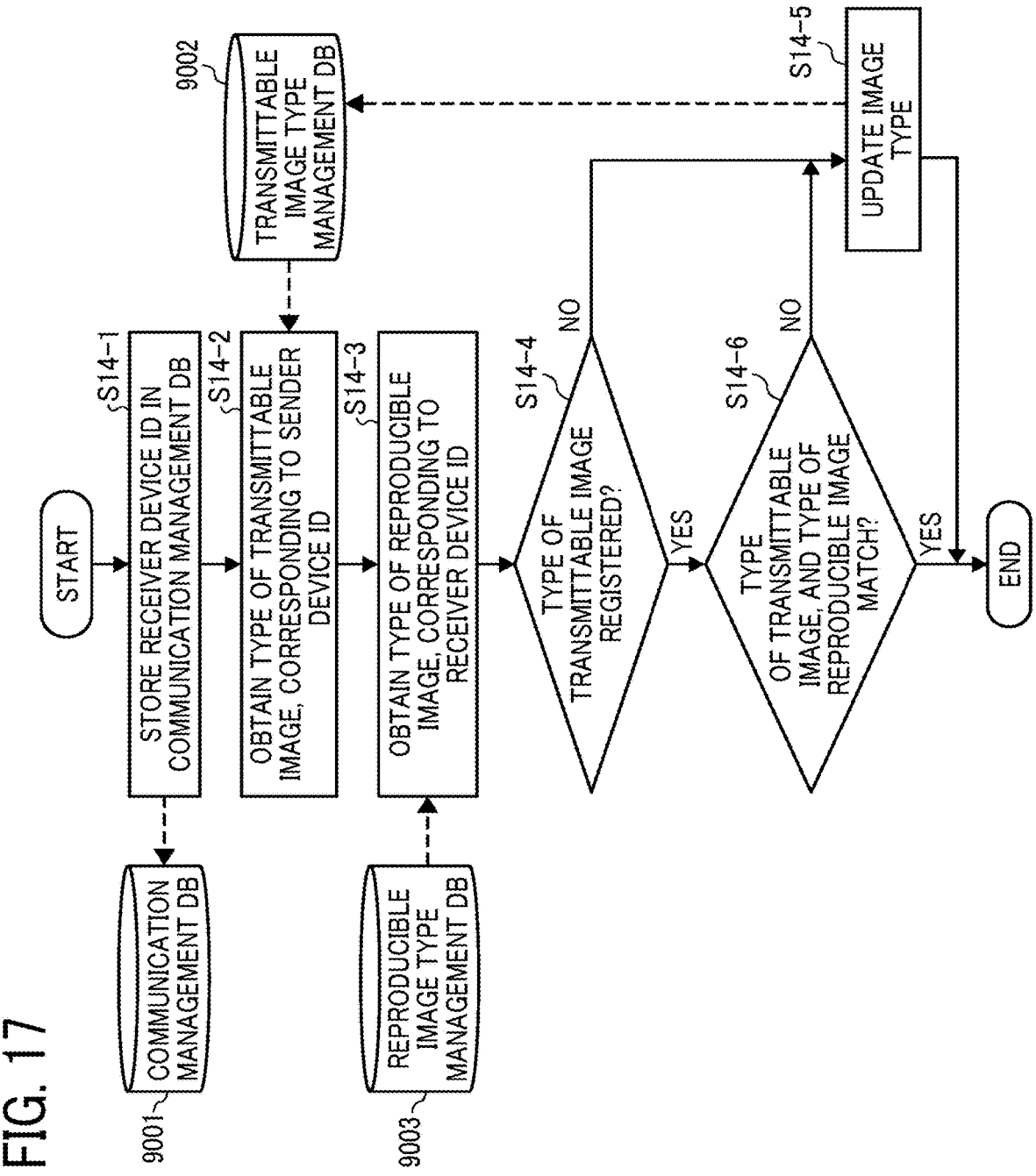
FIG. 17 is a flowchart illustrating operation of determining a type of image data, according to an embodiment.

Referring now to FIG. 17, processing to determine a type of image is described according to an example. FIG. 17 is a flowchart illustrating processing to determine an image type in this example.

As illustrated in FIG. 17, the storing and reading unit 99 stores, in the communication management DB 9001 (FIG. 14A), the device ID of a transmission destination, included in the notification indicating that image data can be received (S14-1). In this case, a new entry is generated in the communication management DB 9001 for a communication established between the image acquisition terminal 2 and the electronic whiteboard 8. Accordingly, the device ID "01aa" of the image acquisition terminal 2 as the sender, and the device ID "02aa" of the electronic whiteboard 8 as the receiver are stored in association.

The storing and reading unit 99 searches the transmittable image type management DB 9002 (FIG. 14B) using the sender device ID received at S11, as a search key, to obtain a type of image that is transmittable by the transmission source as the sender (S14-2). In this example, the image acquisition terminal 2 is a sender.

The storing and reading unit 99 further searches the reproducible image type management DB 9003 (FIG. 14C) using the receiver device ID received at S11, as a search key, to obtain a type of image that is reproducible by the transmission destination as the receiver (S14-3). In this example, the electronic whiteboard 8 is a receiver. S14-2 and S14-3 may be performed in any order.

Next, the determiner 93 determines whether there is any image type that has been registered to the transmittable image type management DB 9002, for example, as a result of S14-2 (S14-4).

When there is no image type registered ("NO" at S14-4), the storing and reading unit 99 refers to the transmittable image type management DB 9002, to change a transmittable image type of the sender with the sender device ID received at S11, from "None" to the image type that is obtained at S14-3 for the receiver with the receiver ID received at S11 (S14-5). In this specific example, since the electronic whiteboard 8 has transmitted the notification, as the receiver, the image type in the transmittable image type management table of FIG. 14B is changed from "None" to "S" indicating a type of image reproducible by the electronic whiteboard 8 that is obtained at S14-3. The operation then ends.

Next, the case where the video conference terminal 7 sends a request for transmission of image data is described. For the descriptive purposes, it is assumed that the request for transmission received from the video conference terminal 7 is processed after processing the request for transmission received from the electronic whiteboard 8. However, this can be processed before, or at substantially the same time with, the time when the request form the electronic whiteboard 8 is processed.

S14-1 to S14-4 are performed in a substantially similar manner as described above. Specifically, in response to the notification received at S11, the communication management server 9 adds the device ID "02ab" of the video conference terminal 7 in the "device ID of the receiver" field, in association with the device ID "01aa" of the image acquisition terminal 2 as the sender.

At S14-4, it is determined that there is an image type that has been registered to the transmittable image type management DB 9002. When the determiner 93 determines that information on the image type has been registered at S14-4 ("YES" at S14-4), operation proceeds to S14-6. At S14-6, the determiner 93 determines whether the transmittable image type obtained at S14-2, and the reproducible image type obtained at S14-3 match (S14-6).

When it is determined that the image types match ("YES" at S14-6), the operation ends to proceed to S15 of FIG. 15. When the determiner 93 determines that the image types differ ("NO" at S14-6), the storing and reading unit 99 updates an entry of the transmittable image type management DB 9002, to include the image type stored in the reproducible image type management DB 9003, obtained at S14-3, in association with the device ID of the receiver (S14-5).

In this specific example, the reproducible image type of the receiver that has obtained at S14-3 is "V2", which differs from "S" stored in the transmittable image type management table of FIG. 14B for the sender ID "01aa". In such case, the image type "S" is changed to "S, V2", such that the reproducible image type "V2" for the video conference terminal 7 ("02ab") is added. The operation then ends to proceed to S15 of FIG. 15.

Through operation of FIG. 17, information on types of image to be transmitted by the sender can be dynamically changed.

Referring back to FIG. 15, after S14, the transmitter and receiver 91 of the communication management server 9 transmits a transfer request for requesting transfer of image data, to the relay device 10 (S15). The transfer request includes the device ID of the sender and the device ID of the receiver, received at S11, and information on the image type obtained at S14. Specifically, the information on the image type is obtained from the transmittable image type management table of FIG. 14B. That is, the information on the image type in the transmittable image type management table of FIG. 14B indicates the type of image transmittable by the sender and reproducible by the receiver. The transmitter and receiver 101 of the relay device 10 receives the transfer request.

Next, at the relay device 10, the storing and reading unit 109 stores the device ID of the sender and the device ID of the receiver, included in the transfer request, in the transfer image type management DB 10001 (S16). In this specific example, the device ID "02aa" of the electronic whiteboard 8 as the receiver that can reproduce the planar still image data "S" is stored in the "device ID of receiver for planar still image" field. The device ID "02ab" of the video conference terminal 7 as the receiver that can reproduce the planar video image data "V2" is stored in the "device ID of receiver for planar video image" field.

At the real-time data processing terminal 3, the image processing unit 34 encodes the spherical video image data (S18). The communication unit 48 outputs data of an equirectangular projection image as illustrated in FIG. 4C, to the communication unit 58 of the terminal data processing device 5 (S19). The transmitter and receiver 51 of the terminal data processing device 5 transmits the data of the equirectangular projection image, received at the communication unit 58, to the relay device 10 through the communication network 600 (S20). The transmitter and receiver 101 of the relay device 10 receives the data of equirectangular projection image.

Figure 18:
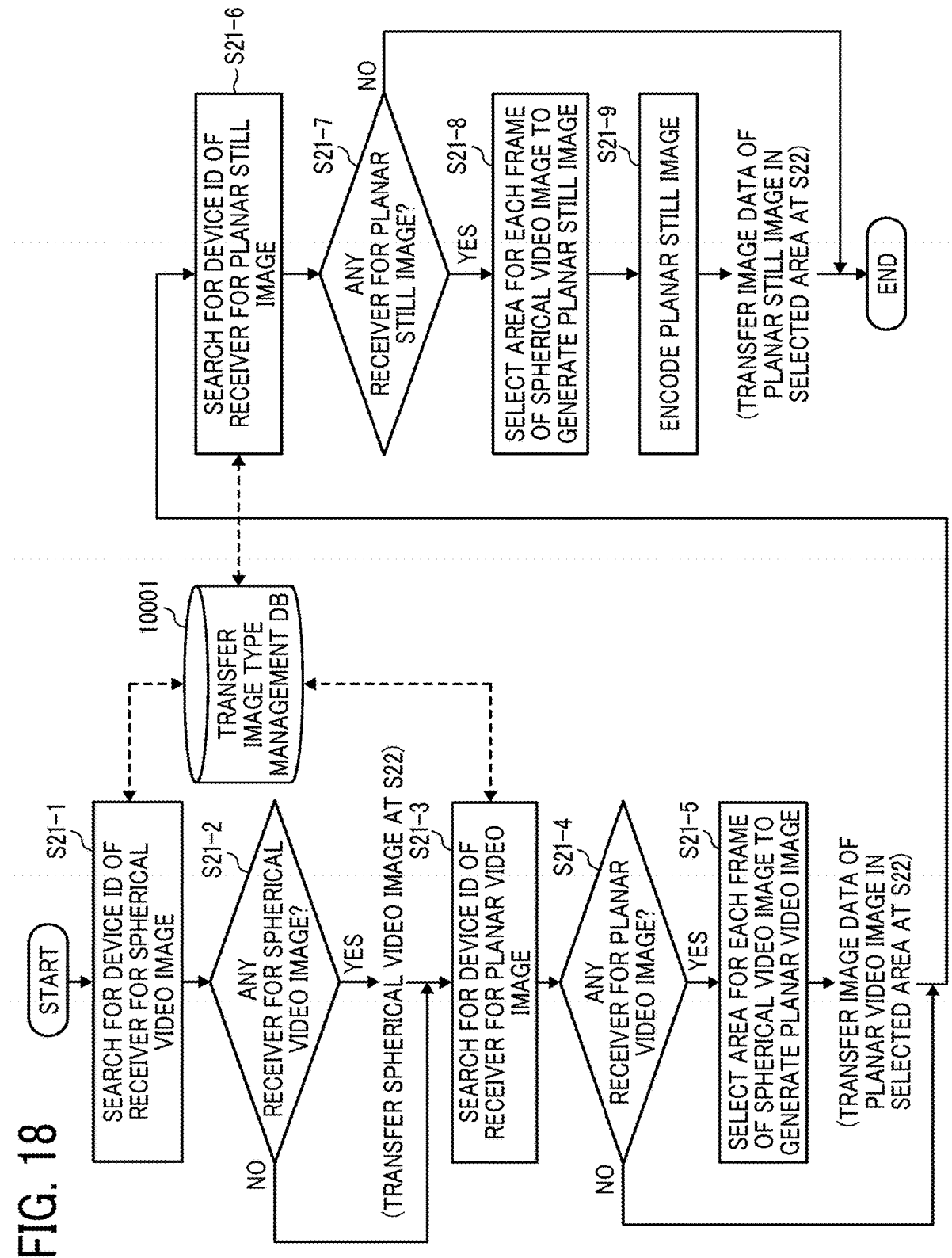
FIG. 18 is a flowchart illustrating operation of determining a type of image data, according to an embodiment.

The relay device 10 determines a type of image that is transferrable to the transmission destination (S21). The processing of determining an image type that is transferrable is described in detail with reference to FIG. 18. FIG. 18 is a flowchart illustrating processing to determine an image type of image to be transferred.

The storing and reading unit 109 of the relay device 10 searches the transfer image type management DB 10001 using the device ID of sender as a search key to obtain a value in the "device ID of receiver for spherical video image" field (S21-1). The device ID of sender has been obtained at the relay device 10 from the terminal data processing device 5 (image acquisition terminal 2), when a communication session is established between the image acquisition terminal 2 and the relay device 10 before performing operation of FIG. 15.

The determiner 103 determines whether any receiver is capable of reproducing spherical video image data, based on whether any device ID is stored in the "device ID of receiver for spherical video image" of the transfer image type management DB 10001 (S21-2).

When it is determined that any device ID is stored, that is, there is any receiver capable of reproducing spherical video image data ("YES" at S21-2), the transmitter and receiver 101 transfers spherical video image data to the receiver having the device ID stored in the "device ID of receiver for spherical video image" field (S22). For example, based on the data of equirectangular projection image, the relay device 10 generates spherical video image data, and transmit the spherical video image data to the receiver. The receiver can then receive the spherical video image data.

When it is determined that no device ID is stored, that is, there is no receiver capable of reproducing spherical video image data ("NO" at S21-2), the transmitter and receiver 101 does not send spherical video image data.

In this specific example, since there is no device ID stored in the "device ID of receiver for spherical video image" field, spherical video image data is not transmitted at S22.

The storing and reading unit 109 searches the transfer image type management DB 10001 using the device ID of sender as a search key to obtain a value in the "device ID of receiver for planar video image" field (S21-3).

The determiner 103 determines whether any receiver is capable of reproducing planar video image data, based on whether any device ID is stored in the "device ID of receiver for planar video image" of the transfer image type management DB 10001 (S21-4).

When it is determined that any device ID is stored, that is, there is any receiver capable of reproducing planar video image data ("YES" at S21-4), the image processing unit 104 selects a part of the spherical video image defined by a first imaging direction and a first angle of view (called "first partial area"), for each of frames of spherical video image data (S21-5), to generate planar video image data. The transmitter and receiver 101 transfers planar video image data, which includes the first partial area of spherical video image data, to the receiver having the device ID stored in the "device ID of receiver for planar video image" field (S22). The receiver can then receive the planar video image data indicating the first partial area of spherical video image. The first imaging direction and the first angle of view may be previously set, for example, according to the user preference.

When it is determined that no device ID is stored, that is, there is no receiver capable of reproducing planar video image data ("NO" at S21-4), the transmitter and receiver 101 does not send planar video image data.

In this specific example, since there is one device ID "02ab" stored in the "device ID of receiver for planar video image" field, planar video image is transmitted at S22 to the video conference terminal 7.

The storing and reading unit 109 searches the transfer image type management DB 10001 using the device ID of sender as a search key to obtain a value in the "device ID of receiver for planar still image" field (S21-6).

The determiner 103 determines whether any receiver is capable of reproducing planar still image data, based on whether any device ID is stored in the "device ID of receiver for planar still image" of the transfer image type management DB 10001 (S21-7).

When it is determined that any device ID is stored, that is, there is any receiver capable of reproducing planar still image data ("YES" at S21-7), the image processing unit 104 selects a part of the spherical video image defined by a second imaging direction and a second angle of view (called "second partial area"), for each of frames of spherical video image data (S21-8), to generate planar still image data. The second imaging direction and the second angle of view may be previously set, for example, according to the user preference.

The image processing unit 104 encodes the planar still image data including the second partial area of spherical video image data (S21-9). The transmitter and receiver 101 transfers the planar still image data, which is encoded, to the receiver having the device ID stored in the "device ID of receiver for planar still image" field (S22).

When it is determined that no device ID is stored, that is, there is no receiver capable of reproducing planar still image data ("NO" at S21-7), the transmitter and receiver 101 does not send planar still image data.

In this specific example, since there is the device ID "02aa" of the electronic whiteboard 8 stored in the "device ID of receiver for planar still image" field, the transmitter and receiver 101 transfers the planar still image data to the electronic whiteboard 8. The electronic whiteboard 8 as the receiver receives the planar still image data.

Next, referring to FIG. 15, the receiver reproduces the image data that is received (S23). In this specific example, the electronic whiteboard 8, which receives the planar still image data at S22, processes the planar still image data to display a planar still image on the display 820. The video conference terminal 7, which receives the planar video image data at S22, processes the planar video image data to display a planar video image on the display.

As described above, when a transmittable image type for the sender (image acquisition terminal 2) and a reproducible image type for the receiver (video conference terminal 7, electronic whiteboard 8) dot not match, the relay device 10 applies image processing to image data received from the sender, to generate image data that is compatible with the receiver.

In one example, when a new apparatus is introduced, information on the transmittable image type for the image acquisition terminal 2 is updated, to include an image type that is reproducible by the newly introduced apparatus. Specifically, as described above referring to FIG. 15, the transmittable image type management table of FIG. 14B is updated, based on information obtained from the reproducible image type management table of FIG. 14C. The updated information is then recorded to the transfer image type management table of FIG. 14D. The relay device 10 refers to the updated transfer image type management table to determine a type of image data to be transferred to each apparatus as a receiver. With this configuration, the apparatus as the receiver is able to reproduce image data.

While the above-described example illustrated in FIGS. 15 to 18 describes the case where the electronic whiteboard 8 and the video conference terminal 7 are newly introduced, the above-described operation of FIGS. 15 to 18 is applicable to other example case, such as the example case in which the image type for any exiting apparatus is modified.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, any processing to be performed by any one of the processors, such as the CPU 301, 501, 701, 901, and 1001 may be performed by any combination of these processors. In one example, the communication management server 9 may be performed by a single processor or a plurality of processors.

Further, any one of data or information stored in databases may be collectively managed with any number of database. For example, the transmittable image type management DB 9002 (FIG. 14B) and the reproducible image type management DB 9003 (FIG. 14C) may be integrated into one database.

Moreover, the communication management server 9 and the relay device 10 may be integrated into one system. In such case, communication between the relay device 10 and the communication management server 9, such as processing of S15, does not have to be performed. Further, processing to determine a type of image that is transmittable by the transmission source and reproducible by the transmission destination may be performed at once at S14. In such case, the transfer image type management DB 10001 does not have to be provided, if the same information can be managed using the transmittable image type management DB 9002, which can be modified based on the reproducible image type management DB 9003.

Further, the above-described operation of FIG. 18 may be performed in various other ways. For example, the relay device 10 may determine whether the receiver is capable of reproducing video image data. When it is determined that the receiver is not capable of reproducing video image data, the relay device 10 may apply processing to generate still image data from the video image data. For example, the relay device 10 may select one of a plurality of frames of video image data to generate still image data. Since still image data can generally processed at any apparatus, the relay device 10 may simply determine to convert the spherical video image data to planar still image data.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on a chip (SOC), GPU, and conventional circuit components arranged to perform the recited functions.

The invention claimed is:

1. A communication system, comprising:
a relay apparatus, communicatively coupled to a first apparatus and a second apparatus over a network, for transferring image data transmitted from a transmission source to a transmission destination, the relay apparatus including circuitry configured to:
receive video image data from the first apparatus being the transmission source;
determine whether the second apparatus being a transmission destination is configured to reproduce the video image data received from the first apparatus;
based on a determination that the second apparatus is not configured to reproduce the video image data received from the first apparatus, apply image processing to the video image data to generate converted image data compatible with the second apparatus; and
transfer the converted image data compatible with the second apparatus to the second apparatus; and
a server, which controls communication between the first apparatus and the second apparatus, the server including:
a memory that stores, for each transmission source that has been registered, information on a type of image that is transmittable by the transmission source and reproducible by the transmission destination; and
another circuitry configured to:
receive a request for transmitting image data from the second apparatus, the request including an identifier of the first apparatus being the transmission source and an identifier of the second apparatus being the transmission destination;
update the information on the type of image stored for the first apparatus to include a type of image that is reproducible by the second apparatus, as the type of image that is transmittable by the first apparatus and reproducible by the second apparatus; and
transmit a transfer request for transferring the video image data to the relay apparatus, the transfer request including information on the type of image that is transmittable by the first apparatus and reproducible by the second apparatus, wherein
the circuitry of the relay apparatus is configured to determine whether the second apparatus is configured to reproduce the video image data, based on the information on the type of image that is received from the server.

2. The communication system of claim 1, wherein in a case that the determination indicates that the second apparatus is not configured to reproduce the video image data, but configured to reproduce still image data, the circuitry is further configured to select one of a plurality of frames of the video image data to generate still image data, and transfer the generated still image data to the second apparatus.

3. The communication system of claim 1, wherein in a case that the video image data received from the first apparatus is spherical video image data, and the determination indicates that the second apparatus is not configured to reproduce the spherical video image data, the circuitry is further configured to:
  determine whether the second apparatus is configured to reproduce planar still image data, and
  in a case that the second apparatus is determined as being configured to reproduce planar still image data, generate planar still image data corresponding to a specific area of the spherical video image data, the specific area being defined by a specific imaging direction and a specific angle of view, and transfer the planar still image data to the second apparatus.

4. The communication system of claim 1, wherein
  in a case that the video image data received from the first apparatus is spherical video image data, and the determination indicates that the second apparatus is not configured to reproduce the spherical video image data, the circuitry is further configured to determine whether the second apparatus is configured to reproduce planar video image data, and
  in a case that the circuitry determines that the second apparatus is configured to reproduce planar video image data, the circuitry is further configured to generate planar video image data corresponding to a specific area of the spherical video image data, the specific area being defined by a specific imaging direction and a specific angle of view, and transfer the planar video image data to the second apparatus.

5. The communication system of claim 4, wherein the circuitry is further configured to:
  in a case that determining that the second apparatus is not configured to reproduce planar video image data, generate planar still image data corresponding to a specific area of the spherical video image data, the specific area being defined by a specific imaging direction and a specific angle of view, and transfer the planar still image data to the second apparatus.

6. The communication system of claim 1, wherein the circuitry is further configured to:
  receive, from a server, which controls communication between the first apparatus and the second apparatus, a transfer request including an identifier of the first apparatus, an identifier of the second apparatus, and information on a type of image that is both transmittable by the first apparatus and reproducible by the second apparatus; and
  determine whether the second apparatus is configured to reproduce the video image data received from the first apparatus, based on the information on the type of image that is both transmittable by the first apparatus and reproducible by the second apparatus.

7. The communication system of claim 1, wherein
  the relay apparatus further includes another memory that stores, for each particular transmission source of one or more transmission source, information indicating a type of image that is both transmittable by the particular transmission source and reproducible by a particular transmission destination, the information including an identifier of the particular transmission destination.

8. The communication system of claim 7, wherein the circuitry is further configured to search the other memory, using an identifier of the first apparatus as a key, for an identifier of the second apparatus and a corresponding type of image that is reproducible by the second apparatus, the type of image being one of a spherical video image, a planar video image, and a planar still image.

9. The communication system of claim 1, further comprising:
  the first apparatus, which is configured to transmit, to the relay apparatus, equirectangular projection video image data, wherein
  the relay apparatus is further configured to generate spherical video image data based on the equirectangular projection video image data.

10. The communication system of claim 9, further comprising:
  the second apparatus, which is communicably connected with the first apparatus via the relay apparatus, wherein
  the second apparatus is at least one of a personal computer configured to reproduce the spherical video image data, a video conference terminal configured to reproduce planar video image data, and an electronic whiteboard configured to reproduce planar still image data.

11. A method of processing image data in a communication system that includes a relay apparatus, communicatively coupled to a first apparatus and a second apparatus over a network, for transferring image data transmitted from a transmission source to a transmission destination, and a server, which controls communication between the first apparatus and the second apparatus, the method comprising:
  receiving, by the relay apparatus, video image data from the first apparatus being the transmission source;
  determining, by the relay apparatus, whether the second apparatus being a transmission destination is configured to reproduce the video image data received from the first apparatus;
  based on a determination that the second apparatus is not configured to reproduce the video image data received from the first apparatus, applying, by the relay apparatus, image processing to the video image data to generate converted image data compatible with the second apparatus;
  transferring, by the relay apparatus, the converted image data compatible with the second apparatus to the second apparatus;
  storing, in a memory of the server and for each transmission source that has been registered, information on a type of image that is transmittable by the transmission source and reproducible by the transmission destination;
  receiving, by the server, a request for transmitting image data from the second apparatus, the request including an identifier of the first apparatus being the transmission source and an identifier of the second apparatus being the transmission destination;
  updating, by the server, the information on the type of image stored for the first apparatus to include a type of image that is reproducible by the second apparatus, as the type of image that is transmittable by the first apparatus and reproducible by the second apparatus;
  transmitting, by the server, a transfer request for transferring the video image data to the relay apparatus, the transfer request including information on the type of image that is transmittable by the first apparatus and reproducible by the second apparatus; and determining, by the relay apparatus, whether the second apparatus is configured to reproduce the video image data, based on the information on the type of image that is received from the server.

12. The method of claim 11, wherein in a case that the video image data received from the first apparatus is spherical video image data, and the determination indicates that the second apparatus is not configured to reproduce the spherical video image data, the method further comprises:
   determining whether the second apparatus is configured to reproduce planar video image data; and
   based on a determination that the second apparatus is configured to reproduce planar video image data,
      generating planar video image data corresponding to a specific area of the spherical video image data, the specific area being defined by a specific imaging direction and a specific angle of view; and
      transferring the planar video image data to the second apparatus.

13. The method of claim 12, wherein in a case that the determination indicates that the second apparatus is not configured to reproduce planar video image data, the method further comprises:
   generating planar still image data corresponding to a specific area of the spherical video image data, the specific area being defined by a specific imaging direction and a specific angle of view; and
   transferring the planar still image data to the second apparatus.

* * * * *